United States Patent
Nagashima et al.

(10) Patent No.: US 6,461,736 B1
(45) Date of Patent: Oct. 8, 2002

(54) LIGHT-COLORED GLASS OF HIGH TRANSMITTANCE AND METHOD FOR PRODUCTION THEREOF, GLASS PLATE WITH ELECTRICALLY CONDUCTIVE FILM AND METHOD FOR PRODUCTION THEREOF, AND GLASS ARTICLE

(75) Inventors: Yukihito Nagashima, Osaka (JP); Akihiro Koyama, Osaka (JP); Isamu Kuroda, Osaka (JP); Masahiro Hirata, Osaka (JP); Masato Hyodo, Osaka (JP); Koichiro Nakamura, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/786,378

(22) PCT Filed: Sep. 1, 1999

(86) PCT No.: PCT/JP99/04754

§ 371 (c)(1),
(2), (4) Date: Mar. 2, 2001

(87) PCT Pub. No.: WO00/14021

PCT Pub. Date: Mar. 16, 2000

(30) Foreign Application Priority Data

| Sep. 4, 1998 | (JP) | 10-251287 |
| Oct. 30, 1998 | (JP) | 10-311227 |
| Jun. 18, 1999 | (JP) | 11-173216 |
| Aug. 6, 1999 | (JP) | 11-223584 |
| Aug. 9, 1999 | (JP) | 11-225301 |

(51) Int. Cl.[7] ......... B32B 17/06; C03C 3/087; C03B 27/00

(52) U.S. Cl. ......... 428/432; 428/426; 501/70; 65/99.1; 65/114

(58) Field of Search ......... 501/70, 64; 65/99.1

(56) References Cited

U.S. PATENT DOCUMENTS

| 3,833,388 A | * 9/1974 | Ohlberg et al. ........... 428/34 |
| 4,532,537 A | 7/1985 | Kane |
| 5,030,593 A | 7/1991 | Heithoff |
| 5,030,594 A | 7/1991 | Heithoff |

(List continued on next page.)

FOREIGN PATENT DOCUMENTS

| JP | 4-228450 | 8/1992 |
| JP | 4-228451 | 8/1992 |
| JP | 5-221683 | 8/1993 |

(List continued on next page.)

OTHER PUBLICATIONS

Jesus Arribas Gila, May 1967, VIII Annual Meeting of Spanish Ceramic Society, "Composition and fabrication of glass molds", no month.

Dragos et al., 1978, *Industria Usoara*, 12:456–459, "Studies on the manufacture of thermoabsorbent glass using the Pittsburgh process", no month.

*Primary Examiner*—Deborah Jones
*Assistant Examiner*—Gwendolyn A. Blackwell-Rudasill
(74) *Attorney, Agent, or Firm*—Merchant & Gould P.C.

(57) ABSTRACT

Light-colored high-transmittance glass is provided which is made of a composition containing, as coloring components, on a weight percent basis, 0.02 to 0.06% (excluding 0.06%) total iron oxide based on $Fe_2O_3$, less than 0.024% FeO, and 0 to 0.5% cerium oxide and having a ratio of FeO based on $Fe_2O_3$ to the total iron oxide of less than 40%. The light-colored high-transmittance glass has a solar radiation transmittance of at least 87.5% and a visible light transmittance measured with the illuminant C of at least 90% when having a thickness of 3.2 mm. A glass sheet with a conductive film also is provided which includes a transparent conductive film formed on a surface of a glass sheet formed of the light-colored high-transmittance glass.

32 Claims, 17 Drawing Sheets

U.S. PATENT DOCUMENTS

| | | | | |
|---|---|---|---|---|
| 5,071,796 A | * | 12/1991 | Jones et al. | 501/69 |
| 5,214,008 A | * | 5/1993 | Beckwith et al. | 501/69 |
| 5,656,559 A | | 8/1997 | Combes et al. | |
| 5,700,305 A | * | 12/1997 | Lowe et al. | 427/162 |
| 5,762,674 A | * | 6/1998 | Maltby et al. | 65/182.2 |

FOREIGN PATENT DOCUMENTS

| | | |
|---|---|---|
| JP | 6-150742 | 5/1994 |
| JP | 7-41337 | 2/1995 |
| JP | 7-198245 | 8/1995 |
| JP | 7-283432 | 10/1995 |
| JP | 8-40742 | 2/1996 |
| JP | 8-506314 | 7/1996 |
| JP | 10-180947 | 7/1998 |
| JP | 10-186128 | 7/1998 |
| JP | 10-223146 | 8/1998 |
| JP | 10-226534 | 8/1998 |
| WO | WO94/18135 | 8/1994 |

* cited by examiner

LIGHT-COLORED GLASS OF HIGH TRANSMITTANCE AND METHOD FOR PRODUCTION THEREOF, GLASS PLATE WITH ELECTRICALLY CONDUCTIVE FILM AND METHOD FOR PRODUCTION THEREOF, AND GLASS ARTICLE

TECHNICAL FIELD

The present invention relates to soda-lime-based glass with a light color tone and a high light transmittance and to a method of manufacturing the same. Furthermore, the present invention relates to a glass sheet with a conductive film in which a transparent conductive film is formed on a surface of a glass sheet and to a method of manufacturing the same. In addition, the present invention relates to glass articles manufactured using the glass sheet with a conductive film, such as photoelectric conversion devices such as solar cells, multiple-glazing units, refrigerators, information displays, copiers, and the like.

BACKGROUND ART

Recently, lightly colored glass, particularly, hardly colored glass, so-called crystal clear glass tends to be preferred as building exterior glass. In addition, in the field of solar-electric power generation that receives attention again as a measure to reduce the carbon dioxide release amount and a countermeasure for fossil fuel exhaustion, there have been demands for a solar cell panel cover glass contributing to the improvement in power generation efficiency.

In order to meet such demands, conventionally, lightly colored high light transmittance glass has been used which is obtained by using high purity raw materials so that an iron content is reduced considerably as compared to that in conventional soda-lime-based glass.

A glass sheet with a conductive film in which a transparent conductive film is formed on a surface of a glass sheet is used in some applications. For instance, demands for such a glass sheet as low-emissivity glass (Low-E glass) have increased in a field of building window glass. In this field, in order to shield electromagnetic waves, a glass sheet with a conductive film may be used in some cases. The glass sheet with a conductive film also is used as a solar cell substrate. Furthermore, such a glass sheet also is provided as a base component of information displays such as liquid crystal displays (LCD), plasma display panels (PDP), or the like. The glass sheet with a conductive film also is used as a door plate of a display refrigerator for shops or a copier document plate.

Generally, in such applications, the glass sheet with a conductive film is required to have a high light transmittance. For example, in a solar cell, such a glass sheet is required to have a high transmittance in a wavelength region in which a photoelectric conversion device has high conversion efficiency. Similarly in various kinds of window glass, it is necessary to compensate for the decrease in visible light transmittance caused by the formation of a transparent conductive film.

A glass sheet with a conductive film can satisfy the aforementioned demands when using glass in which an iron content is reduced considerably as compared to that in conventional soda-lime-based glass.

The following description is directed to conventionally known high transmittance glass.

The glass disclosed in JP 4(1992)-228450 A contains, on a weight percent basis, less than 0.02% total iron oxide based on $Fe_2O_3$ as a coloring component and has a composition in which a ratio of FeO to the total iron oxide is set to be at least 0.4. In this glass, a visible light transmittance of at least 87% (measured with the illuminant C) can be obtained when the glass has a thickness of 5.66 mm. This glass sheet has been developed exclusively for furniture and provides a pure and bright azure color tone.

Aragonite as calcium carbonate mineral or hydrated aluminum is used as a raw material of the glass disclosed in the above-mentioned publication. Such a special material is used so that iron is prevented from being mixed as impurities. In addition, the above-mentioned glass also is characterized by being manufactured using a batch composition with a small $SO_3$ content and being manufactured by a method including separate melting and refining stages as a melting operation.

A glass composition disclosed in JP 4(1992)-228451 A also contains a small amount of total iron oxide as described above and further contains trace amounts of Se and CoO. In this glass, a dominant wavelength of transmitted light is in a range of 570 to 590 nm, and this glass provides an appearance harmonizing with a wooden style. This glass also was developed exclusively for furniture.

Similarly in the glass disclosed in JP 4(1992)-228451 A, limestone or dolomite that contains a relatively large amount of iron oxide as an impurity cannot be used so that the amount of total iron oxide is suppressed to be less than 0.02% based on $Fe_2O_3$, on a weight percent basis, as in the glass disclosed in JP 4(1992)-228450 A. Therefore, a special material such as the calcium carbonate mineral described above is necessary, resulting in expensive glass.

In the glass disclosed in JP 4(1992)-228450 A, it is required to set the ratio of FeO to the total iron oxide to be at least 0.4 to obtain a desired pure and bright azure color. In order to obtain such a specific appearance, it is necessary to employ a special manufacturing method including separate melting and refining stages as a melting operation and to suppress the $SO_3$ content, resulting in further expensive glass.

On the other hand, a method also has been proposed in which oxidizing agents such as cerium oxide is added, so that a content of FeO that is a principal component causing the decrease in transmittance in the above-mentioned wavelength region is decreased.

For instance, in the glass disclosed in JP 5(1993)-221683 A, 0.1 to 0.5 wt % $CeO_2$ is contained as an oxidizing agent in conventional soda-lime-based glass containing 0.06 to 0.12 wt % impurity iron based on $Fe_2O_3$. In this glass, since a $Fe^{2+}/Fe^{3+}$ ratio is lowered considerably, a higher transmittance can be obtained in a wavelength region around 600 nm or longer. In this glass, the $Fe^{2+}/Fe^{3+}$ ratio is lowered to 3 to 10% from the ratio (38%) in the conventional soda-lime-based glass.

In this glass, since the $Fe^{2+}/Fe^{3+}$ ratio is lowered considerably, the absorption of light with wavelengths around 400 nm caused by $Fe_2O_3$ is increased. The increase in the $Fe_2O_3$ content causes the glass color tone to be yellowish. Such an appearance is not suitable, for example, for building window glass. In addition, the increase in the $Fe_2O_3$ content also lowers the light transmittance in a wavelength region around 500 nm or shorter. Such a transmission characteristic may be a hindrance when the glass is used as a substrate of an amorphous silicon solar cell having a high energy conversion efficiency in the wavelength region around 500 to 600 nm. Moreover, a relatively large amount of oxidizing agent is required for oxidizing a high concentration of iron. Therefore, the above-mentioned glass cannot always be manufactured at low cost.

None of the above-mentioned publications describes the formation of a transparent conductive film on a surface of a glass sheet.

With respect to the glass disclosed in JP 8(1996)-40742, consideration is given to the formation of a metal oxide coating film on a glass sheet. This glass was developed to be used for building windows and was developed for the purpose of shifting an absorptance in a near infrared region with the transmittance in the visible light region being maintained so that the absorption of solar radiation by glass windows is improved. According to the composition table specifically disclosed in the above-mentioned publication, this purpose is achieved through the reduction of a total amount of alkaline-earth metal oxide to be not more than about 10 wt % while an amount of $Fe_2O_3$ is comparable to that in conventional soda-lime-based glass. In this glass, the content of the alkaline-earth metal oxide is reduced and therefore, the wavelength region of light absorbed by FeO is shifted to the longer wavelength side.

However, the glass disclosed in JP 8(1996)-40742 is not suitable for use where a light color tone and a high transmittance are required, although the wavelength region of light absorbed by FeO is shifted to the longer wavelength side. In the above-mentioned glass, the amount of alkaline-earth metal oxide is reduced (namely, 9 wt % CaO and 0 wt % MgO in a composition example in the above-mentioned publication), and the inconvenience in melting caused by the reduction is compensated by an increase in the $Na_2O$ content. Therefore, liquidus temperature and manufacturing cost are high and thus the composition is not suitable for mass production.

It also has been known to increase the quantity of light passing thorough a glass sheet not by adjusting the composition of the glass sheet but by forming a reflection suppressing film (an antireflection film) on a surface of the glass sheet. An optical multilayer film with an optical interference effect is used as the reflection suppressing film in many cases. Generally, the reflection suppressing film is formed by a deposition method using vacuum equipment such as a sputtering method or a vacuum evaporation method.

As described above, the compositions of conventionally disclosed high transmittance glass are not suitable for industrial mass production at low cost.

In addition, the compositions of conventional high transmittance glass mainly were developed for specific applications requiring no transparent conductive film to be formed. Therefore, even when a transparent conductive film is formed on such high transmittance glass, it is not possible to mass-produce, at low cost, glass sheets with a conductive film having suitable characteristics for glass articles such as solar cells (particularly, amorphous silicon solar cells), multiple-glazing units, refrigerators, information displays, and copiers, which are the main applications of glass sheets with a conductive film. As to this point, the same is true even when the glass disclosed in JP 8(1996)-40742 A is used.

DISCLOSURE OF THE INVENTION

The present invention is intended to provide light-colored high-transmittance glass that can be mass-produced at low cost. The present invention also is intended to provide a method of manufacturing the light-colored high-transmittance glass at low cost. Furthermore, the present invention is intended to provide a glass sheet with a conductive film that has a high transmittance and can be mass-produced at low cost and to provide a method of manufacturing the same. In addition, the present invention is intended to provide glass articles in which such a glass sheet with a conductive film is used, specifically, solar cells, multiple-glazing units, refrigerators, information displays, and copiers.

First light-colored high-transmittance glass of the present invention formed as a glass sheet contains silica as a main component and is characterized by having a composition containing, as coloring components, on a weight percent basis:

0.02 to 0.06% (excluding 0.06%) total iron oxide (hereinafter referred to as "$T\text{-}Fe_2O_3$") based on $Fe_2O_3$; less than 0.024% FeO; and 0 to 0.5% cerium oxide, having a ratio of FeO based on $Fe_2O_3$ to $T\text{-}Fe_2O_3$ (hereinafter referred to as "a FeO ratio") of less than 40%, and having, when having a thickness of 3.2 mm:

a solar radiation transmittance of at least 87.5%; and a visible light transmittance measured with the illuminant C of at least 90%.

Second light-colored high-transmittance glass of the present invention formed as a glass sheet contains silica as a main component and is characterized by having, when having a thickness of 3.2 mm:

a light transmittance of at least 91% at a wavelength of 500 nm; and a light transmittance of not higher than 91% at a wavelength of 1100 nm.

These light-colored high-transmittance glasses have a high transmittance and can be mass-produced at low cost.

A method of manufacturing light-colored high-transmittance glass according to the present invention is characterized in that a raw material containing dolomite and limestone is used for the manufacture of the above-mentioned light-colored high-transmittance glass.

A glass sheet with a conductive film of the present invention is characterized by including a glass sheet made of the first or second light-colored high-transmittance glass and a transparent conductive film formed on a surface of the glass sheet.

A glass sheet with a conductive film that has a high transmittance and can be mass-produced at low cost can be provided through the formation of a transparent conductive film on a glass sheet containing the coloring components of the above-mentioned first light-colored high-transmittance glass.

In addition, a glass sheet with a conductive film that has a high transmittance and can be mass-produced at low cost can be provided through the formation of a transparent conductive film on a glass sheet having the optical characteristics of the second light-colored high-transmittance glass. In this glass sheet, the light transmittance is set to be not higher than 91% at a wavelength of 1100 nm, so that excessive increase in manufacturing cost is avoided. However, in the wavelength region around 500 nm in which amorphous silicon solar cells have high sensitivity and a man perceives brightness easily (visibility is high), the light transmittance is maintained to be at least 91%.

A method of manufacturing a glass sheet with a conductive film according to the present invention is characterized by including forming a transparent conductive film on a glass ribbon during a process of manufacturing the glass sheet by a float process using heat of the glass ribbon to manufacture the glass sheet with a conductive film.

In addition, according to the present invention, various glass articles in which the above-mentioned glass sheets with a transparent conductive film are used can be provided as described in detail later.

For instance, a photoelectric conversion device of the present invention is characterized by including the glass sheet with a transparent conductive film and a photoelectric conversion layer formed on a surface of the transparent conductive film of the glass sheet with a transparent conductive film. A thin film solar cell including a silicon layer as the photoelectric conversion layer is preferable as the photoelectric conversion device. Since the quantity of light passing through a substrate is related directly to photoelectric conversion efficiency, particularly, a glass sheet with a conductive film having a reflection suppressing film formed thereon as described later is suitable as a substrate for the photoelectric conversion device.

Furthermore, for instance, a multiple-glazing unit of the present invention includes at least two glass sheets positioned to oppose each other via one layer selected from an air layer, an inert gas layer, and a reduced pressure layer, and is characterized in that at least one of the glass sheets is the above-mentioned glass sheet with a conductive film. This multiple-glazing unit has an excellent visible light transmission characteristic and allows a natural view to be obtained.

In addition, for example, a refrigerator of the present invention is characterized in that the above-mentioned multiple-glazing unit is installed in a door and the transparent conductive film included in the multiple-glazing unit is used as a heating element (a defroster). Since this refrigerator mainly is used for display of sales products in shops and also has an excellent visible light transmittance, it allows goods to be displayed naturally while exhibiting a defogging function.

Furthermore, for instance, an information display of the present invention is characterized by including the above-mentioned glass sheet with a conductive film and displaying information through the glass sheet with a conductive film. Such information displays are not particularly limited but include LCD, PDP, and the like. Similarly in this information display, its high visible light transmittance enables clear and natural information displays, especially for color displays.

Moreover, for example, a copying machine of the present invention is characterized by including the above-mentioned glass sheet with a conductive film and optically readable information to be copied through the glass sheet with a conductive film. In this copier, the glass sheet is placed, for instance, in a document plate and the transparent conductive film exhibits an antistatic function and prevents paper jam or the like. In addition, its high visible light transmittance enables accurate copying, especially for color copying.

The glass sheet with a conductive film of the present invention can be utilized in various glass articles. The glass sheet with a conductive film of the present invention is different from the conventional high transmittance glass with a very low iron content developed for furniture and can be manufactured at a low cost while a required light transmission property is secured.

BEST MODE FOR CARRYING OUT THE INVENTION

Figure 1:
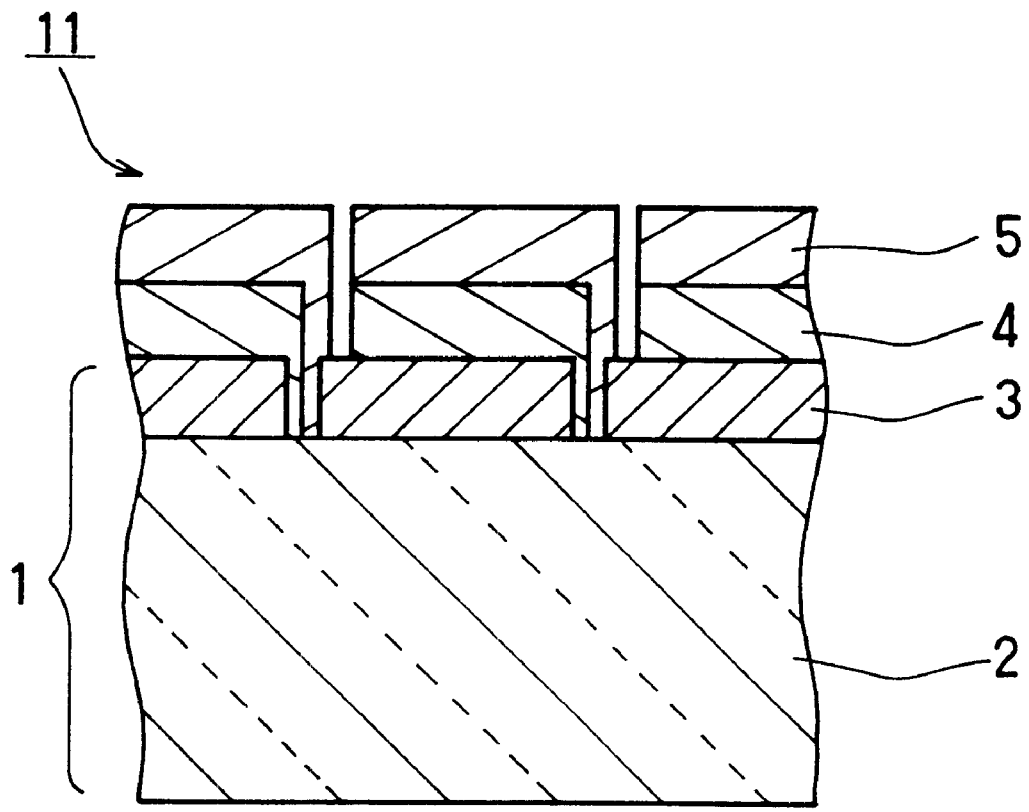
FIG. 1 is a partial sectional view showing an embodiment of a solar cell according to the present invention.

Preferable embodiments of the present invention are described as follows.

First, the following description is directed to light-colored high-transmittance glass of the present invention.

Preferably, when having a thickness of 3.2 mm, the first light-colored high-transmittance glass of the present invention has a light transmittance of at least 91% at a wavelength of 500 nm and a light transmittance of not higher than 91% at a wavelength of 1100 nm as in the second light-colored high-transmittance glass. Preferably, the second light-colored high-transmittance glass of the present invention contains the same coloring components as those in the first light-colored high-transmittance glass and has a solar radiation transmittance of at least 87.5% and a visible light transmittance (the illuminant C) of at least 90%, when having a thickness of 3.2 mm, as in the first light-colored high-transmittance glass.

Preferably, the light-colored high-transmittance glass of the present invention has a light transmittance of at least 91.3% at a wavelength of 500 nm when having a thickness of 3.2 mm. When the light-colored high-transmittance glass has the above-mentioned thickness, the lower limit of its light transmittance at a wavelength of 1100 nm is not particularly limited, but is, for instance, 85%.

Preferably, the light-colored high-transmittance glass of the present invention contains, on a weight percent basis, 0.02 to 0.05% T-$Fe_2O_3$ and less than 0.016% FeO as the coloring components.

In the light-colored high-transmittance glass of the present invention, the dominant wavelength is longer than 495 nm and shorter than 575 nm and the excitation purity is not higher than 0.4%.

A preferable embodiment of the light-colored high-transmittance glass according to the present invention is made of a composition containing, on a weight percent basis, more than 0.004% FeO and having a FeO ratio of at least 15%, and when it has a thickness of 3.2 mm, the dominant wavelength measured with the illuminant C is shorter than 565 nm and the excitation purity is not higher than 0.3%.

Further preferably, this embodiment is made of a composition containing, on a weight percent basis, less than 0.012% FeO and having a FeO ratio of 20 to 30% and when it has a thickness of 3.2 mm, the dominant wavelength measured with the illuminant C is shorter than 560 nm.

The above-mentioned embodiment is suitable as building glass with a desirable light color tone due to the suitably low T-$Fe_2O_3$ content and the FeO ratio that is not extremely low. Particularly, the preferable embodiment is suitable as glass for a solar cell with amorphous silicon having a sensitivity peak of energy conversion in a wavelength around 500 to 600 nm.

Since a suitable amount of FeO is contained, the above-mentioned embodiment also provides another preferable effect of suitably absorbing solar radiation causing temperature increase in silicon that negatively affects the photoelectric conversion efficiency.

Another preferable embodiment of the light-colored high-transmittance glass according to the present invention is made of a composition containing, on a weight percent basis, less than 0.008% FeO and 0.025 to 0.5% cerium oxide and having a FeO ratio of not higher than 22%, and when it has a thickness of 3.2 mm, the solar radiation transmittance is at least 89.5%, the ultraviolet ray transmittance prescribed in ISO 9050 is not higher than 60%, and the dominant wavelength measured with the illuminant C is longer than 540 nm.

Further preferably, this embodiment is made of a composition containing, on a weight percent basis, less than 0.006% FeO and 0.025 to 0.25% cerium oxide, and when it has a thickness of 3.2 mm, the solar radiation transmittance is at least 90.5%, the ultraviolet ray transmittance prescribed in ISO 9050 is not higher than 55%, and the dominant wavelength measured with the illuminant C is longer than 555 nm.

The above-mentioned embodiment is suitable as so-called colorless sheet glass also called "crystal clear glass", which is particularly desirable for a building material, due to the suitably low T-$Fe_2O_3$ content and FeO ratio. This embodiment also is suitable as glass for a solar cell with crystalline silicon having a sensitivity peak of energy conversion in a wavelength around 1000 nm.

In the above-mentioned embodiment, since the cerium oxide as an oxidizing agent also has an effect of absorbing ultraviolet rays, the embodiment also provides another preferable effect of suitably absorbing ultraviolet rays having an influence, which is not preferable in various glass articles, for example, causing deterioration of silicon in a solar cell.

Preferably, in the light-colored high-transmittance glass of the present invention, its basic glass composition contains, on a weight percent basis:

65 to 80% $SiO_2$;
0 to 5% $Al_2O_3$;
more than 2% MgO;
5 to 15% CaO;
10 to 18% $Na_2O$;
0 to 5% $K_2O$;
7 to 17% MgO+CaO (excluding 7%);
10 to 20% $Na_2O+K_2O$;
0.05 to 0.3% $SO_3$; and
0 to 5% $B_2O_3$.

Further preferably, this light-colored high-transmittance glass contains more than 10% MgO+CaO and more than 0.1% $SO_3$. More preferably, it is substantially free from fluorine, barium oxide, and strontium oxide.

Preferably, the light-colored high-transmittance glass of the present invention is substantially free from any coloring component other than iron oxide, cerium oxide, and manganese oxide.

The light-colored high-transmittance glass of the present invention exhibits its effect considerably when used as substrate glass or cover glass for a solar cell panel, a material for a solar-energy collecting water heater, a solar heat transmissive window glass material, an uncolored high transmittance mirror, uncolored high transmittance window glass, display protection case glass, or substrate glass for a flat display such as a front panel.

In the manufacture of the light-colored high-transmittance glass according to the present invention, for cost reduction, it is preferred to use alumina-containing silica sand as a raw material in addition to dolomite and limestone as in the conventional soda-lime-based glass. The limitation of the iron oxide content in the above-mentioned range allows this raw material to be used.

Preferably, for cost reduction, the (batch) material of the light-colored high-transmittance glass is melted in a tank-type furnace in which its upper part is heated as in the case of the conventional soda-lime-based glass. This is because melting and refining stages can be carried out inside one tank.

The following description is directed to the reason for the limitation of the composition of the above-mentioned glass. In the following description, the composition is indicated on a weight percent basis.

The iron oxide is present as $Fe_2O_3$ and FeO in the glass. The component $Fe_2O_3$ enhances the ultraviolet ray absorbency and FeO the heat absorbency.

In order to obtain a desired light color tone and high transmittance, it is required that the total iron oxide (T-$Fe_2O_3$) is 0.02 to 0.06% (excluding 0.06%), FeO is less than 0.024%, and FeO based on $Fe_2O_3$ is less than 40% of T-$Fe_2O_3$. When the total iron oxide (T-$Fe_2O_3$) is less than 0.02%, a high purity raw material with a lower iron content is required to be used as the raw material, resulting in a considerable cost increase. When the total iron oxide and FeO contents and the FeO ratio are equal to or more than the upper limits of the respective ranges, the visible light transmittance is excessively low and the blue color tone becomes strong due to FeO.

In order to obtain a lighter color tone and higher visible light transmittance, preferably, the total iron oxide (T-$Fe_2O_3$) is 0.02 to 0.05% and FeO is less than 0.016%.

When the glass is to be used in an amorphous silicon solar cell that preferably has a high transmittance in a wavelength around 500 to 600 nm and a suitable solar radiation absorptance, it is preferable that FeO is more than 0.004% and the FeO ratio is at least 15% in the above-mentioned range of the T-$Fe_2O_3$ content. In this case, however, an excessively large amount of FeO and an excessively high FeO ratio cause a stronger color tone of the glass. Therefore, it is further preferable that FeO is less than 0.012% and the FeO ratio is in a range of 20 to 30%.

On the other hand, when the glass is used in a solar cell including crystalline silicon preferably having a high transmittance in a wavelength around 1000 nm, it is preferable that FeO is less than 0.008% (preferably less than 0.006%) and the FeO ratio is not higher than 22% in the above-mentioned range of the total iron oxide content.

The component cerium oxide is effective for adjusting FeO and the FeO ratio. In order to achieve a small amount of FeO and a low FeO ratio required when a high transmittance particularly in a wavelength around 1000 nm is desired or when glass hardly colored is to be obtained, preferably 0.025 to 0.5% (further preferably 0.025 to 0.25%) cerium oxide is added in total.

The component $SiO_2$ is a main component of the network of glass. When $SiO_2$ is less than 65%, durability of the glass decreases, and when $SiO_2$ exceeds 80%, it becomes difficult to melt the glass.

The component $Al_2O_3$ improves the durability of the glass. However, it becomes difficult to melt the glass when $Al_2O_3$ exceeds 5%. Preferably, $Al_2O_3$ is in a range between 0.1 and 2.5%.

The components MgQ and CaO improve the durability of the glass and also are used for adjusting the liquidus temperature and viscosity during formation. When MgO is not more than 2%, the liquidus temperature increases. When CaO is less than 5% or exceeds 15%, the liquidus temperature increases. When the total amount of MgO and CaO is not more than 7%, the durability of the glass decreases, and when the total amount exceeds 17%, the liquidus temperature increases. When the total amount of MgO and CaO is small, for instance, not more than 10%, it is required to increase the amount of $Na_2O$ to compensate for the deterioration in melting property and the increase in viscosity of a glass melt, which causes an increase in cost and a decrease in chemical durability of the glass. Preferably, therefore, the total amount of MgO and CaO is more than 10%.

The components $Na_2O$ and $K_2O$ are used as melting accelerators. When $Na_2O$ is less than 10% or the total amount of $Na_2O$ and $K_2O$ is less than 10%, the melting accelerating effect is poor. When $Na_2O$ exceeds 18% or the total amount of $Na_2O$ and $K_2O$ exceeds 20%, the durability of the glass decreases. Since the raw material of $K_2O$ is expensive compared to that of $Na_2O$, it is preferable that $K_2O$ does not exceed 5%.

The component $SO_3$ enhances the refining of the glass. When $SO_3$ is less than 0.05%, a sufficient refining effect cannot be obtained by a general melting method. The preferable range of $SO_3$ is 0.1% and more. On the other hand, when $SO_3$ exceeds 0.3%, $SO_2$ generated by its decomposition may remain in the glass as bubbles or bubbles may tend to be generated by reboiling.

The component $B_2O_3$ is used for improving the durability of the glass or as a melting auxiliary. When $B_2O_3$ exceeds 5%, inconvenience in the formation due to volatilization of $B_2O_3$ or the like occurs. Therefore, the upper limit of $B_2O_3$ is set to be 5%.

Although $TiO_2$ is not an essential component, it can be added in a suitable amount within a range not damaging the optical characteristics of the object of the present invention for the purpose of the improvement in ultraviolet ray absorbency or the like. An excessively large amount of $TiO_2$ tends to cause the glass to be yellowish and decreases the transmittance in a wavelength around 500 to 600 nm. Preferably, therefore, the content of $TiO_2$ is in a range less than 0.2%.

The effect of the present invention is not damaged even when fluorine, barium oxide, or strontium oxide is contained. However, these components have undesired influences in view of the cost increase, furnace lifetime, release of harmful matters into the atmosphere, or the like. Preferably, therefore, the glass is substantially free from them.

As the component to be added as an oxidizing agent to the glass with a composition within the above-mentioned ranges, cerium oxide in the range defined above is preferable in view of its effect and another preferable effect of ultraviolet ray absorption. However, the other oxidizing agent, for example, manganese oxide in a range not more than 1% may be added with cerium oxide or may be used individually.

Furthermore, $SnO_2$ may be added as a reducing agent in a range not more than 1%. In a range not damaging the light color tone intended in the present invention, at least one of Se, CoO, $Cr_2O_3$, NiO, $V_2O_5$, $MoO_3$, and the like also may be added as a colorant. However, since the addition of the colorant strengthens the color tone and decreases the visible light transmittance, it is preferable :that the glass is substantially free from such a colorant.

Next, the following description is directed to a preferable embodiment of a glass sheet with a conductive film according to the present invention.

Preferably, a transparent conductive film is formed from at least one metal oxide layer. In addition, preferably, this metal oxide layer includes a layer containing tin oxide as a main component. A tin oxide film can be deposited at a lower cost compared to, for example, an ITO (Indium Tin Oxide) film. Furthermore, preferably, the layer containing tin oxide as a main component contains at least one selected from chlorine, fluorine, and antimony.

For the further cost reduction, preferably, the transparent conductive film is formed on a glass ribbon during a manufacturing process of a glass sheet by the float process using heat of the glass ribbon.

In the glass sheet with a conductive film, preferably, the glass sheet has a pair of principal surfaces parallel to each other, the transparent conductive film is formed on one of the principal surfaces, and a reflection suppressing film is formed on the other of the principal surfaces. The principal surfaces denote main surfaces of the glass sheet except for its end faces.

Preferably, the reflection suppressing film includes a plurality of layers that are stacked on a glass sheet and are different in refractive index from each other. It is preferable that specifically, the plurality of layers are formed as an optical multilayer film decreasing the reflectance by an optical interference effect. The reflection suppressing film may be formed by a deposition method using a vacuum device, but preferably, is a film formed through application of a coating solution and then baking it as in a sol-gel method. This is because such a method is suitable for mass-production at low cost, particularly when the film is to be deposited on a large area glass sheet.

The reflection suppressing film may be a porous layer formed on the surface of a glass sheet. Preferably, this porous layer is a silica skeleton layer containing silica as a main component, which is formed by selective removal of at least one glass constituent other than silica from the glass sheet. The silica skeleton layer is a porous layer having a silica skeleton as a frame network. This layer can be formed, for example, by an etching method in which a glass sheet is dipped in a silica supersaturated aqueous solution of hexafluorosilicic acid.

In addition, preferably, the reflection suppressing film is formed by a method including a quenching step and the glass sheet is tempered by the quenching step. According to this preferable example, the glass sheet is allowed to be a tempered glass sheet while the reflection suppressing film is formed. It is preferable that the glass sheet is heated to at least a softening point of the glass and then is quenched.

The transparent conductive film is described further in detail as follows.

Preferably, the transparent conductive film is formed of at least one metal oxide layer. The transparent conductive film includes at least one conductive layer. As the conductive layer, a layer containing ZnO as a main component or an ITO layer may be used, but it is preferable to use a layer containing $SnO_2$ as a main component.

Preferably, the layer containing $SnO_2$ as a main component contains at least one selected from chlorine, fluorine, and antimony, and particularly it is preferable that it is a layer containing fluorine added to $SnO_2$. The fluorine content is not particularly limited, but the range of 0.1 to 1 wt. % is suitable.

Preferably, the transparent conductive film is, specifically, a film with a layer containing $SnO_2$ as a main component (layer $SnO_2$) and a layer containing $SiO_2$ as a main component (layer $SiO_2$), which are stacked. The number of layers to be stacked and the thickness of the respective layers may be selected suitably depending on intended use. For instance, however, in the case of a two-layer structure, it is preferable that the film includes a layer $SiO_2$ and a layer $SnO_2$, which are stacked sequentially on the surface of a glass sheet. For instance, in the case of a three-layer structure, it is preferable that the film includes a first layer $SnO_2$, a layer $SiO_2$, and a second layer $SnO_2$, which are stacked sequentially on the surface of a glass sheet.

The following is an example of preferable thicknesses of the respective layers in the transparent conductive film with the two-layer structure.

| | |
|---|---|
| Layer $SiO_2$: | 10 nm to 100 nm |
| Layer $SnO_2$: | 20 nm to 300 nm |

The following is an example of preferable thicknesses of the respective layers in the transparent conductive film with the three-layer structure.

| | |
|---|---|
| First layer $SnO_2$: | 10 nm to 40 nm |
| Layer $SiO_2$: | 10 nm to 40 nm |
| Second layer $SnO_2$: | 100 nm to 1000 nm |

Various deposition methods that have been applied conventionally, such as vacuum evaporation method, a sputtering method, a wet-coating method, and the like, can be employed as the method of forming a metal oxide film on a glass sheet. However, when consideration is given to the productivity and coating film durability, a chemical vapor deposition method (a CVD method) or a spray method such as a solution spray method, a dispersion liquid spray method, a powder spray method, or the like is preferable.

In the CVD method, film forming vapor containing a compound to be incorporated into a metal oxide film may be used. In the solution spray method, a solution containing a predetermined metallic compound may be sprayed on a high temperature glass substrate. In the dispersion liquid spray method, a dispersion liquid in which fine particles of a metallic compound are dispersed in a solution or a solvent is used instead of the above-mentioned solution. In the powder spray method, powders of a metallic compound may be used instead of the above-mentioned solution.

In the spray method, a liquid in which respective components are premixed may be sprayed as fine droplets or powder or the respective components may be sprayed separately as droplets or powder at the same time to react with one another.

In the spray method, however, a uniform film thickness cannot be obtained easily due to the difficulty in controlling droplets to be sprayed or products to be exhausted such as a reaction product, an undecomposed product, or the like. In addition, considerable stress occurs in the glass sheet. Therefore, the CVD method is superior overall.

When respective metal oxide films are formed by the CVD method, generally, gaseous materials are fed onto a glass sheet that has been cut to have a predetermined size and has been heated. For example, while a glass sheet is placed on a mesh belt and is passed through a furnace, the materials are supplied and are allowed to react on the surface of the glass sheet with a high temperature, and thus the metal oxide films are deposited.

In order to omit the step of reheating the glass sheet that has been cooled after being melted, it is preferred to deposit the metal oxide films on a high temperature glass ribbon by the CVD method using thermal energy in forming the glass sheet (in float glass formation). Particularly, when the CVD method is carried out inside a float bath, the deposition can be carried out on a glass surface having a temperature equal to or higher than its softening point. Thus, the film performance, film growth rate, and film forming reaction efficiency can be improved.

When the deposition is carried out on a glass ribbon in the float process, it is preferable that, for instance, a predetermined number of coaters are placed in a space at a predetermined distance from the surface of the glass ribbon moving inside a float bath or an annealing furnace, and gaseous materials are supplied from the coaters. When a plurality of coaters are used, a transparent conductive film with a plurality of stacked layers can be formed continuously on the glass ribbon.

The metal oxide films may be formed using both the CVD method and the spray method. For example, the CVD method and the spray method are carried out in this order (for instance, deposition by the CVD method is carried out inside the float bath and deposition by the spray method is carried out in the annealing furnace), so that predetermined stacked layers may be obtained.

Examples of materials used for deposition of the metal oxide films are described as follows.

Silicon materials for $SiO_2$ deposition by the CVD method include monosilane, disilane, trisilane, monochlorosilane, 1,2-dimethylsilane, 1,1,2-trimethyldisilane, 1,1,2,2-tetramethyl disilane, tetramethyl orthosilicate, tetraethyl orthosilicate, or the like. Oxidation materials include oxygen, water vapor, dry air, carbon dioxide, carbon monoxide, nitrogen dioxide, ozone, or the like.

When silane is used, for the purpose of preventing the silane from reacting before reaching the glass surface and controlling the refractive index of the silicon oxide film, an unsaturated hydrocarbon such as ethylene, acetylene, toluene, or the like may be added. In addition, when tetramethyl orthosilicate, tetraethyl orthosilicate, or the like is used, aluminium isopropoxide or the like may be added to improve the film growth rate.

Tin materials for $SnO_2$ deposition by the CVD method include monobutyltin trichloride, tin tetrachloride, dimethyltin dichloride, dibutyltin dichloride, dioctyltin dichloride, tetramethyltin, tetrabutyltin, dibutyltin diacetate, or the like. Oxidation materials include oxygen, water vapor, dry air, or the like.

When antimony is to be added as an additive, antimony trichloride, antimony pentachloride, or the like can be used. When fluorine is to be added, hydrogen fluoride, trifluoroacetic acid, bromotrifluoromethane, chlorodifluoromethane, difluoroethane, or the like may be used.

Silicon materials used for deposition by the spray method include tetramethyl orthosilicate, tetraethyl orthosilicate, or the like. In order to improve the film growth rate, acetylacetone zirconium or the like may be added.

Tin materials used for deposition by the spray method include tin tetrachloride, dibutyltin dichloride, tetramethyltin, dioctyltin dichloride, dimethyltin dichloride, tetraoctyltin, dibutyltin oxide, dibutyltin dilaurate, dibutyltin fatty acid, monobutyltin fatty acid, monobutyltin trichloride, dibutyltin diacetate, dioctyltin dilaurate, or the like.

The reflection suppressing film is described further in detail as follows.

Preferably, the reflection suppressing film is formed of a plurality of thin films with different refractive indexes and is a multilayer film including at least three layers. A multilayer film including a first layer with an intermediate refractive index ($n_1$), a second layer with a high refractive index ($n_2$), and a third layer with a low refractive index ($n_3$), which are stacked sequentially, is particularly suitable as an optical multilayer film. The first, second, and third layers can have refractive indices of 1.60 to 1.95, 1.91 to 2.60, and 1.35 to 1.59, respectively. Preferably, the refractive index of the second layer is higher than that of the first layer at least by 0.20, and the refractive index of the third layer is lower than that of the first layer at least by 0.20.

Examples of preferable thicknesses of the respective layers in the reflection suppressing film with the three-layer structure are described as follows.

| First layer: | (60 to 130 nm)/$n_1$ |
|---|---|
| Second layer: | (140 to 230 nm)/$n_2$ |
| Third layer: | (110 to 150 nm)/$n_3$ |

When the thicknesses are set within the above-mentioned ranges, with respect to light with a specific wavelength incident on the surface side (the film side) of the glass sheet on which the reflection suppressing film is formed, the reflectance at the surface on the film side may be reduced to substantially zero.

Examples of materials for the respective layers in the reflection suppressing film with the three-layer structure are described as follows.

Preferably, the second layer contains at least one kind of metal oxide (referred to as "oxide of titanium etc." in this paragraph) selected from titanium oxide, cerium oxide, bismuth oxide, zirconium oxide, niobium oxide, and tantalum oxide, in a total amount of at least 70 mol %. Preferably, the third layer contains 50 to 100 mol % silicon oxide and the oxide of titanium etc. in a total amount of 0 to 10 mol %. Preferably, the first layer contains 15 to 80 mol % silicon oxides and the oxide of titanium etc. in a total amount of 20 to 70 mol %.

According to this, in the hardening process, contraction coefficients of the layer of the low refractive index film and the layer of the high refractive index film and contraction coefficients of the layer of the intermediate refractive index film and the layer of the high refractive index film approach each other, respectively. Consequently, no crack or film peeling tends to occur. In addition, the adhesion at the interfaces between the layers of the low refractive index film and the high refractive index film and between the layers of the intermediate refractive index film and the high refractive index film can be improved.

As a specific embodiment according to the present invention, an example is described as follows, which includes a high refractive index film (the second layer) containing titanium oxide, an intermediate refractive index film (the first layer) containing titanium oxide and silicon oxide, and a low refractive index film (the third layer) containing silicon oxide.

The respective components of the intermediate refractive index film (the first layer) are described further as follows.

The silicon oxide is a component for adjusting the refractive index of the film, and when its content is small, the refractive index of the film increases. On the contrary, when the content is large, the refractive index decreases. The content of the silicon oxide, based on $SiO_2$, is preferably 15 to 80 mol %, more preferably 30 to 78 mol %, and further preferably 35 to 74 mol %. The titanium oxide is required for increasing the refractive index of the film. When the content of the titanium oxide is small, the refractive index of the film decreases and when the content is large, the refractive index of the film increases. The content of the titanium oxide, based on $TiO_2$, is preferably 20 to 70 mol %, more preferably 22 to 65 mol %, and further preferably 25 to 60 mol %.

When the intermediate refractive index film is excessively thin, the antireflection effect is reduced. When it is excessively thick, the antireflection effect also is reduced, or cracks may occur and the film strength decreases. Therefore, the thickness of the intermediate refractive index film is preferably 40 to 60 nm, more preferably 45 to 55 nm, and further preferably 47 to 53 nm. When the refractive index of this film is excessively low, a sufficient antireflection effect cannot be obtained. Therefore, the refractive index of this film is preferably 1.60 to 1.90, more preferably 1.65 to 1.85, and further preferably 1.70 to 1.80.

The following description is directed to the respective components of the high refractive index film (the second layer). The titanium oxide is a component for deposition of the film and for improving the refractive index of the film. When the content of the titanium oxide is small, the refractive index of a colored film decreases. When the content is large, the refractive index of the film increases. The content of titanium oxide, based on $TiO_2$, is preferably 70 to 100 mol %, more preferably 80 to 100 mol %, and further preferably 88 to 100 mol %. The content of silicon oxide, based on $SiO_2$, is preferably 0 to 30 mol %, more preferably 0 to 20 mol %, and further preferably 0 to 12 mol %.

When the high refractive index film is excessively thin, the antireflection effect is reduced. When it is excessively thick, the antireflection effect also is reduced, or cracks may occur and the film strength decreases. Therefore, the thickness of the high refractive index film is preferably 65 to 105 nm, more preferably 75 to 95 nm, and further preferably 80 to 90 nm. When the refractive index of this film is excessively low, a sufficient antireflection effect cannot be obtained. Therefore, the refractive index of this film is preferably 1.91 to 2.30, more preferably 1.96 to 2.30, and further preferably 2.01 to 2.30.

The following description is directed to the respective components of the low refractive index film (the third layer). The silicon oxide is a component for deposition of the film and for decreasing the refractive index of the film. When the content of the silicon oxide is small, the refractive index of the film increases. When the content is large, the refractive index of the film decreases. The content of silicon oxide, based on $SiO_2$, is preferably 85 to 100 mol %, more preferably 90 to 100 mol %.

When the low refractive index film is excessively thin, the antireflection effect is reduced. When it is excessively thick, the antireflection effect also is reduced, or cracks may occur and the film strength decreases. Therefore, the thickness of the low refractive index film is preferably 65 to 105 nm, more preferably 75 to 95 nm, and further preferably 80 to 90 nm. When the refractive index of this film is excessively low, a sufficient antireflection effect cannot be obtained. Therefore, the refractive index of this film is preferably 1.35 to 1.59, more preferably 1.35 to 1.50, and further preferably 1.35 to 1.47.

The high, low, and intermediate refractive index films may be formed by a sputter method, a CVD method, or a spray thermal decomposition (pyrolytic) method. As the method of forming them, however, a sol-gel method is desirable in view of the cost. Methods used for coating in the sol-gel method include a spin coating method, a dip coating method, a flow coating method, a roll coating method, a gravure coating method, a flexographic printing method, a screen printing method, or the like.

When optical thin films containing metal oxide such as, for example, titanium oxide, bismuth oxide, silicon oxide, cerium oxide, zirconium oxide, niobium oxide, and tantalum oxide are formed as the high, low, and intermediate refractive index films by the sol-gel method, the coating liquid composition can be obtained through dissolution, into an organic solvent, of a hydrolyzable and condensable metallic compound such as a titanium compound, a bismuth compound, a silicon compound, a cerium compound, a zirconium compound, a niobium compound, or a tantalum compound.

Examples of materials that can be used for the deposition of the reflection suppressing film are described as follows.

Titanium alkoxide, titanium alkoxide chloride, titanium chelate, or the like is used as the titanium compound. Examples of titanium alkoxide include titanium methoxide, titanium ethoxide, titanium n-propoxide, titanium isopropoxide, titanium n-butoxide, titanium isobutoxide, titanium methoxy propoxide, titanium stearyloxide, titanium 2-ethylhexyoxide, and the like. Examples of titanium alkoxide chloride include titanium chloride triisopropoxide, titanium dichloride diethoxide, and the like. Titanium triisopropoxide (2,4-pentanedionate), titanium diisopropoxide (bis-2,4-pentanedionate), titanium allyl acetate triisopropoxide, titanium bis(triethanolamine) diisopropoxide, titanium di-n-butoxide(bis-2,4-pentanedionate), and the like can be used as the titanium chelate.

Bismuth nitrate, bismuth acetate, bismuth oxyacetate, bismuth acetate, bismuth chloride, bismuth alkoxide, bismuth hexafluoropentadionate, bismuth t-pentoxide, bismuth tetramethylheptanedionate, or the like can be used as the bismuth compound.

Cerium nitrate, cerium chloride, or the like is used as the cerium compound.

A compound obtained by adding silicon alkoxide to a solvent such as alcohol, which then is hydrolyzed and polymerized with acidic or basic catalyst can be used as the silicon compound. Silicon methoxide, silicon ethoxide, or oligomer thereof is used as the silicon alkoxide. Hydrochloric acid, sulfuric acid, nitric acid, acetic acid, oxalic acid, trichloroacetic acid, trifluoroacetic acid, phosphoric acid, hydrofluoric acid, formic acid, or the like can be used as the acid catalyst. As the basic catalyst, ammonia or amines can be used.

A cerium organic compound can be used suitably as the cerium compound, including cerium alkoxide, cerium acetylacetonate, cerium carboxylate, or the like. Besides, a cerium inorganic compound such as nitrate, chloride, sulfate, or the like also can be used. However, in view of the stability and availability, nitrate of cerium and cerium acetylacetonate are preferable.

Tetramethoxyzirconium, tetraethoxyzirconium, tetraisopropoxy zirconium, tetra n-propoxy zirconium, tetraisopropoxy zirconium isopropanol complex, tetraisobutoxy zirconium, tetra n-butoxy zirconium, tetra sec-butoxy zirconium, tetra t-butoxy zirconium, or the like can be used suitably and conveniently as the zirconium component. In addition, alkoxide of a zirconium halogenide such as zirconium monochloridetrialkoxide, zirconium dichloridedialkoxide, or the like also can be used. Furthermore, a zirconium alkoxide obtained by chelation of the above-mentioned zirconium alkoxide with a β-ketoester compound also can be used suitably. Examples of a chelator include acetoacetic ester expressed by $CH_3COCH_2COOR$ (where R denotes. $CH_3$, $C_2H_5$, $C_3H_7$, or $C_4H_9$) such as methyl acetoacetate, ethyl acetoacetate, propyl acetoacetate, or butyl acetoacetate. Among such acetoacetic ester, acetoacetic alkyl ester, particularly, methyl acetoacetate and ethyl acetoacetate are suitable, since they are available at relatively low costs. The zirconium alkoxide may be chelated partially or completely, but preferably is chelated in a mole ratio of (β-ketoester)/(zirconium alkoxide)=2 since a stable chelate compound can be obtained. A chelator other than the β-ketoester compound, for example, zirconium alkoxide chelated with acetylacetone is insoluble in a solvent such as alcohol and therefore precipitates, and thus an application solution cannot be prepared using such a chelator. In addition, it also is possible to use alkoxy zirconium organic acid salts in which at least one of alkoxy groups of the above-mentioned zirconium alkoxide is substituted by organic acid such as acetic acid, propionic acid, butanoic acid, acrylic acid, methacrylic acid, stearic acid, or the like.

Niobium pentachloride, niobium pentaethoxide, or the like can be used as the niobium component. Examples of the niobium component also include niobium trimethoxydichloride produced by dissolution of niobium pentachloride into methyl alcohol, niobium triethoxydichloride produced by dissolution of niobium pentachloride into ethyl alcohol, niobium triisopropoxydichloride produced by dissolution of niobium pentachloride into isopropyl alcohol, or the like. Furthermore, the examples include niobium triethoxyacetylacetonate and niobium ethoxydiacetylacetonate, which are produced by addition of acetylacetone to niobium pentaethoxide, or niobium triethoxyethylacetonate and niobium ethoxydiethylacetonate, which are produced by addition of ethyl acetoacetate to niobium pentaethoxide.

Examples of the tantalum compound include tantalum methoxide, tantalum pentaethoxide, tantalum penta n-butoxide, tantalum tetraethoxide acetylacetonate, or the like.

The organic solvent used for the application liquid composition employed for the formation of the high and low refractive index films depends on the coating method. However, examples of the organic solvent include methyl alcohol, ethyl alcohol, isopropanol, butanol, hexanol, octanol, 2- methoxyethanol, 2-ethoxyethanol, 2-butoxyethanol, propylene glycol monomethyl ether, propylene glycol monoethyl glycol, cellosolve acetate, ethylene glycol, propylene glycol, diethylene glycol, diethylene glycol monoethyl ether, hexylene glycol, diethylene glycol, tripropylene glycol, polypropylene glycol, diacetone alcohol, or the like. For the coating liquid composition, the above-mentioned solvents may be used individually or in plural for adjusting the viscosity, surface tension, or the like of the coating liquid. A small amount of stabilizer, leveling agent, thickener or the like may be added as required. The amount of the solvent to be used also depends on the coating method to be employed and the thicknesses of eventually obtained high, intermediate and low refractive index films, but usually is set to give a total solid within a range of 1 to 20%.

The coating liquid composition is applied to one surface of a glass sheet by the application method exemplified above. Then, a drying step and/or a heating step are/is carried out. The heating step is carried out preferably at a temperature of at least 250° C. A deposition process including such application and drying/heating steps is repeated for each layer and thus a reflection suppressing multilayer film is formed. Instead of the drying/heating step, a light irradiation step may be carried out together with the drying/heating step. Preferably, the light used in this step is ultraviolet light.

When a silica skeleton layer is formed as a reflection suppressing film, a preferable thickness of the silica skeleton layer is 50 to 200 nm.

After the multilayer film thus is formed to have a required number of layers, further a heating step is carried out as required. In this step, the glass sheet with the multilayer film formed thereon is heated in a furnace heated to, for example, 500 to 800° C. for 10 seconds to two minutes.

After this step, the glass sheet thus heated may be annealed, or may be quenched to be tempered. This tempering step may be carried out by a blast of cooling air from a nozzle or the like against the surface of the glass sheet. Such an air-cooling tempering step may be carried out, for instance, using a quenching device such as one used in a process of manufacturing automobile tempered glass.

As described above, a coating film including a transparent conductive film is formed on a surface of a glass sheet. On the opposite surface of the glass sheet, a reflection suppressing film may be formed as required. This glass with a conductive film is processed according to its intended use as required. The following description is directed to examples of such processing.

FIG. 1 is a sectional view showing an embodiment of an amorphous silicon solar cell including a glass sheet with a conductive film according to the present invention.

In an amorphous silicon solar cell 11 shown in FIG. 1, an amorphous silicon (a-Si:H) layer 4 is formed on the surface of a transparent conductive film 3 on a glass sheet with a conductive film 1 by a plasma CVD method as a photoelectric conversion layer. Furthermore, a metal electrode layer 5 is formed on the surface of the amorphous silicon layer 4. As shown in FIG. 1, each of the transparent conductive film 3 on the glass sheet 2, the amorphous silicon layer 4, and the metal electrode layer 5 is divided into strip-like portions. Respective divided portions of the transparent conductive film 3, the amorphous silicon layer 4, and the metal electrode layer 5 form a unit cell. Conductive films 3 and metal electrode layers 5 in adjacent unit cells are connected, respectively, and thus unit cells are coupled in series.

A wavelength region allowing an amorphous silicon solar cell to have the highest power generating efficiency is 500 to 600 nm. The glass sheet 2 through which light to be incident on the amorphous silicon layer 4 passes has an excellent transmittance in this wavelength region. As described above, the glass sheet with a conductive film of the present invention has particularly preferable characteristics, especially as a substrate of an amorphous silicon solar cell.

Figure 2:
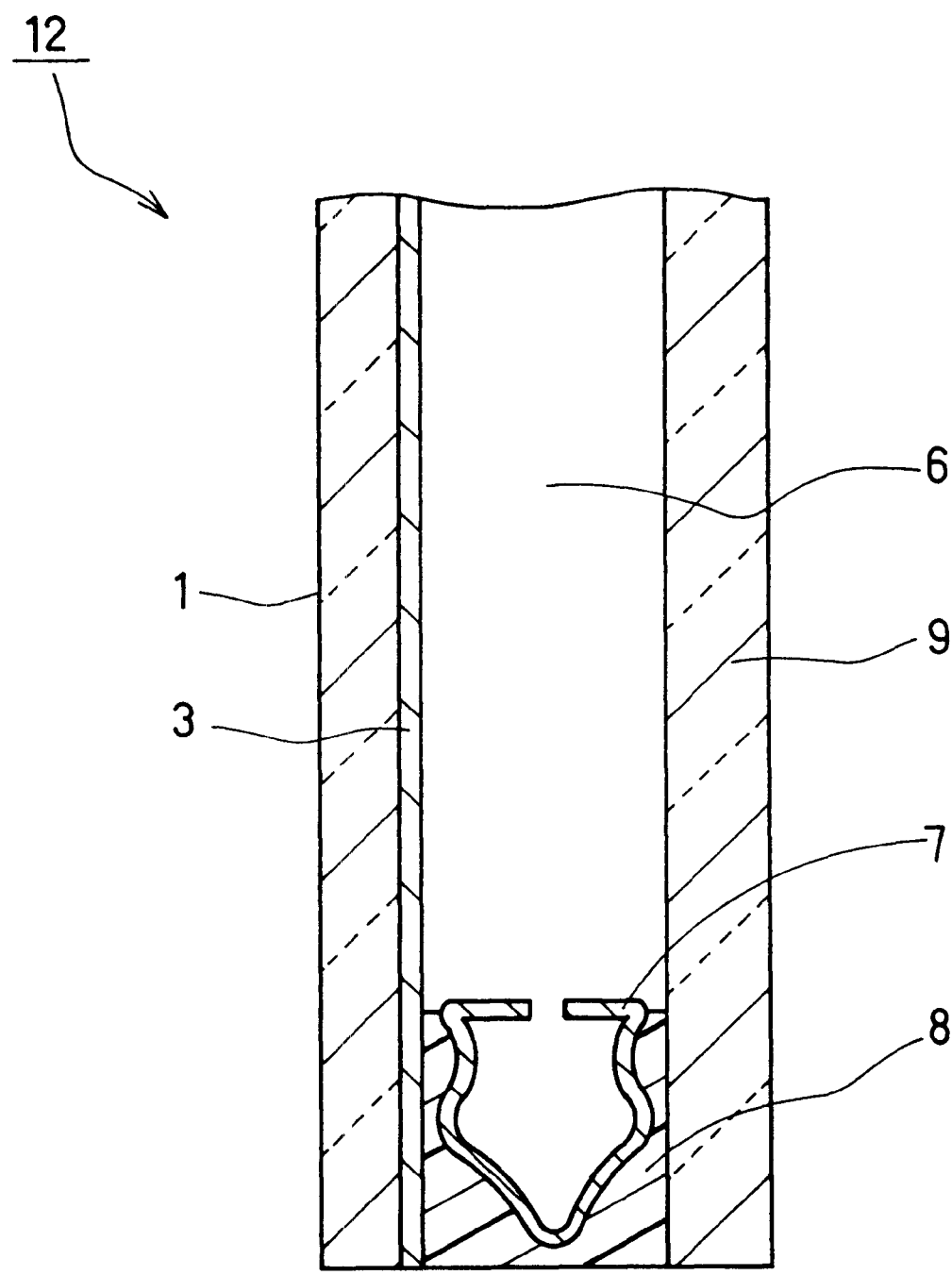
FIG. 2 is a partial sectional view showing an embodiment of a double-glazing unit according to the present invention.

FIG. 2 is a sectional view showing an embodiment of a double-glazing unit including a glass sheet with a conductive film of the present invention.

In a double-glazing unit 12 shown in FIG. 2, a glass sheet with a conductive film 1 is placed so that a conductive film 3 faces an air layer 6. The glass sheet with a conductive film 1 and a glass sheet 9 are bonded at their peripheries with a sealant 8 via a spacer 7 containing a desiccant. FIG. 2 illustrates the double-glazing unit using the glass sheet with a conductive film for only one of the glass sheets. However, the present invention is not limited to this and both the glass sheets may be glass sheets with conductive films.

The air layer 6 may be formed as a reduced pressure layer by exhaustion of the inside air to reduce the pressure. Pressure reduction in the air layer further can improve a heat insulation effect or the like. When the reduced pressure layer is used, it is preferable that the peripheries of the glass sheets are bonded using, for instance, low melting point glass instead of the sealing using the spacer 7 and the sealant 8. In this case, preferably a spacer is placed in the reduced pressure layer to maintain the interval between the glass sheets. Instead of the air layer 6, an inert gas layer in which an inert gas such as an argon gas is sealed may be used.

The double-glazing unit as shown in FIG. 2 can be used as building window glass with an excellent thermal insulation property since the low emissivity glass with the transparent conductive film formed thereon is used. The double-glazing unit also can be used as window glass with an excellent electromagnetic wave shielding characteristic. Furthermore, it also can be used as door glass having a defogging function for refrigerators for shops. When it is used for a refrigerator door, the glass sheet with a conductive film is positioned outside the refrigerator. When being used for an electromagnetic wave shielding window or a refrigerator, the double-glazing unit shown in the figure is further processed. For example, in the case of the former, a ground wire is provided for allowing the transparent conductive film to have a ground potential. In the case of the latter, an electrode terminal is formed for utilizing the transparent conductive film as a heating element by application of voltage to the transparent conductive film, and a wiring is provided for connecting the electrode terminal and a power supply.

Figure 3:
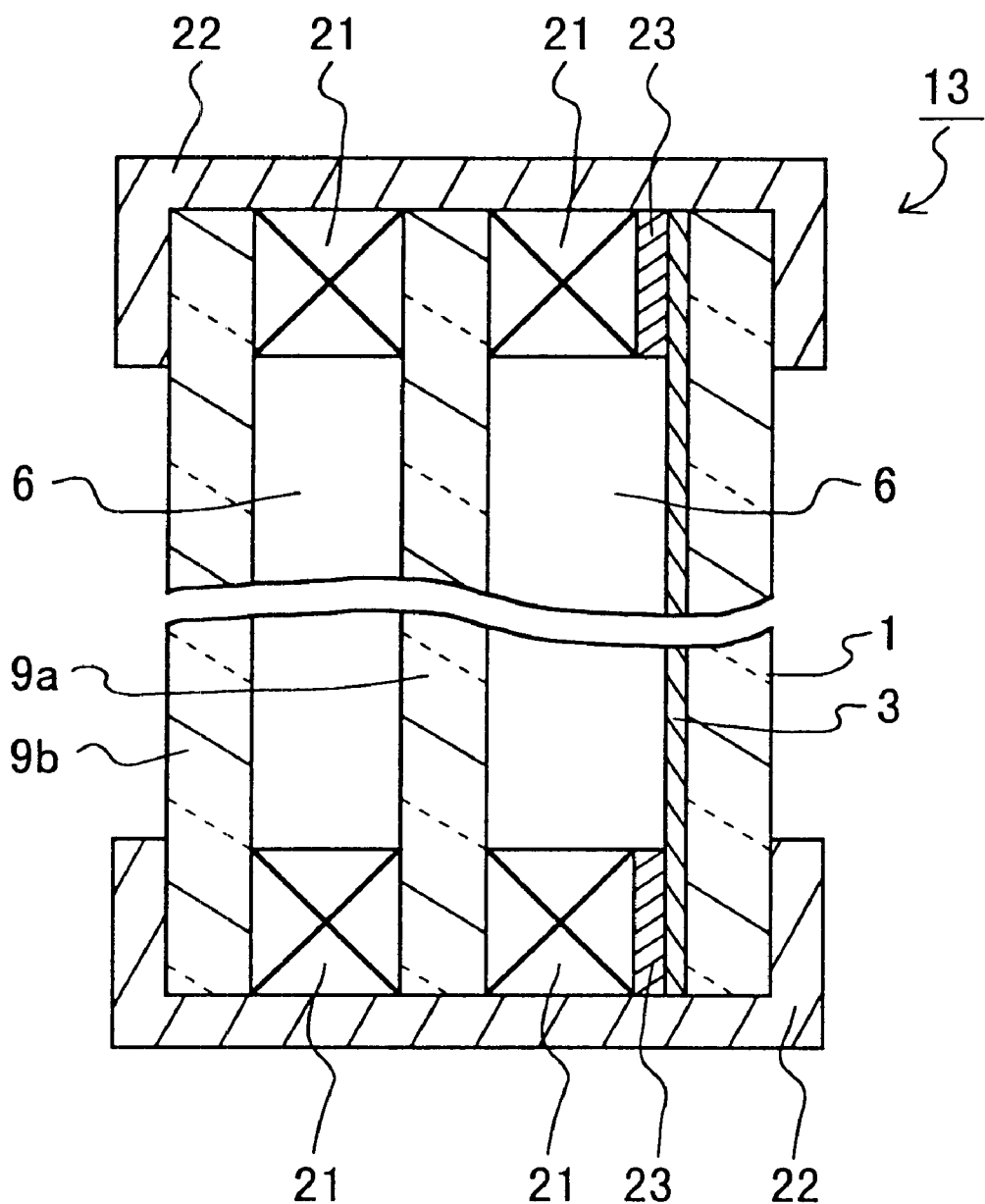
FIG. 3 is a partial sectional view showing an embodiment of a refrigerator glass door using a glass sheet with a conductive film according to the present invention.

FIG. 3 is a sectional view of an embodiment of a glass door including a glass sheet with a conductive film of the present invention. In this glass door 13, a glass sheet with a conductive film 1 and glass sheets 9a and 9b are spaced via air layers 6 and spacers 21, which are combined to form one body using a frame 22, thus forming a multiple-glazing unit. Similarly in this multiple-glazing unit, a transparent conductive film 3 is formed on the air layer 6 side. In order to allow the transparent conductive film to generate heat as a resistor, electrode terminals 23 are placed in contact with the transparent conductive film at the both ends of the transparent conductive film 3. This glass door 13 has a defogging function provided by the heat generation and is suitable as an opening/closing door of a display-type refrigerator used frequently in shops for selling food stuffs or the like.

In the above-mentioned respective applications of the double- and multiple-glazing units, a high visible light transmittance is required. The double- and multiple-glazing units including a glass sheet with a conductive film of the present invention are useful as window glass that can be manufactured at low cost and also has a sufficiently high light transmittance, particularly in a wavelength region in which the visibility is high.

Figure 4:
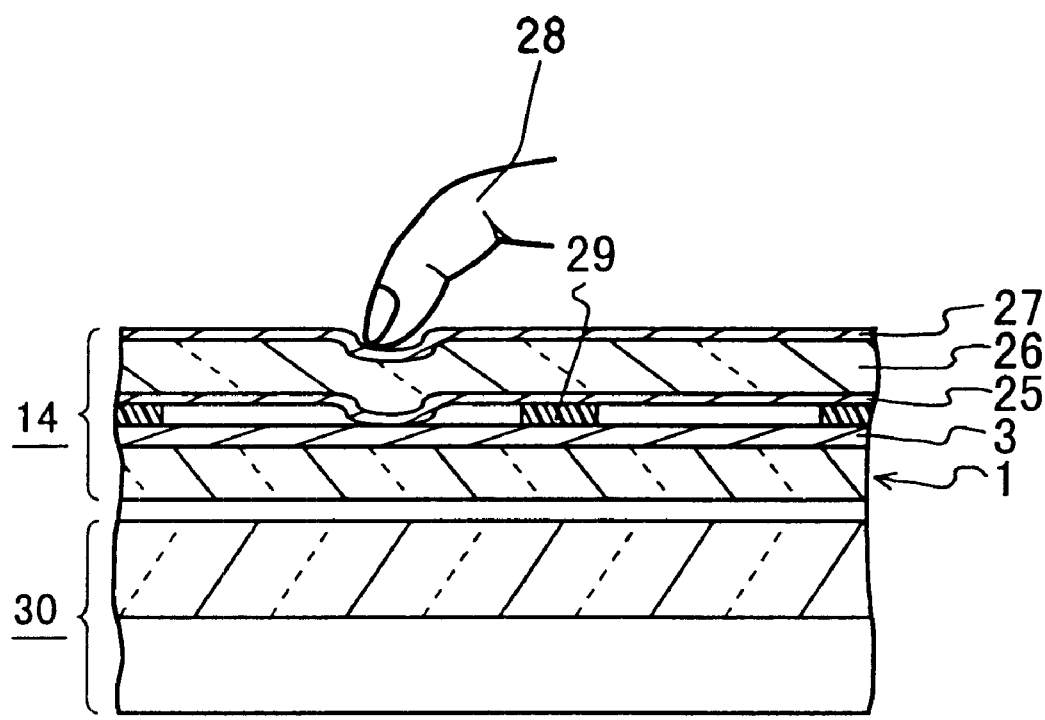
FIG. 4 is a partial sectional view showing an embodiment of an information display using a glass sheet with a conductive film according to the present invention.

FIG. 4 is a sectional view of an embodiment of an information display including a glass sheet with a conductive film of the present invention. This information display is provided with a transparent touch panel 14 allowing information to be displayed and also to be input. In this transparent touch panel 14, a glass sheet with a conductive film 1 and a transparent resin film 26 with a transparent conductive film 25 formed thereon are positioned to oppose each other via spacers 29 positioned sporadically at a predetermined space. In this case, the transparent conductive film 3 on the glass sheet and the transparent conductive film 25 on the film are patterned in a stripe form in one direction orthogonal to each other, respectively. A hard coating film 27 may be formed on the opposite surface of the transparent resin film 26 to that on which the transparent conductive film 25 is formed, as shown in the figure.

In this state, when the transparent resin film 26 formed of a PET film or the like is pressed from the upper side by a finger 28, the resin sheet having flexibility is bent and the transparent conductive films 3 and 25 come into contact with each other. The position of conduction caused by the contact between the transparent conductive films is detected based on voltage change and thus information is input. Furthermore, an image corresponding to the information thus input is displayed by a liquid crystal display element 30 placed under the transparent touch panel. An operator can see this image information through the glass sheet with a conductive film and the transparent resin sheet. The glass sheet with a conductive film with a high visible light transmittance of the present invention is suitable for various equipment (not limited to the equipment shown in the figure) displaying information through the glass sheet.

Figure 5:
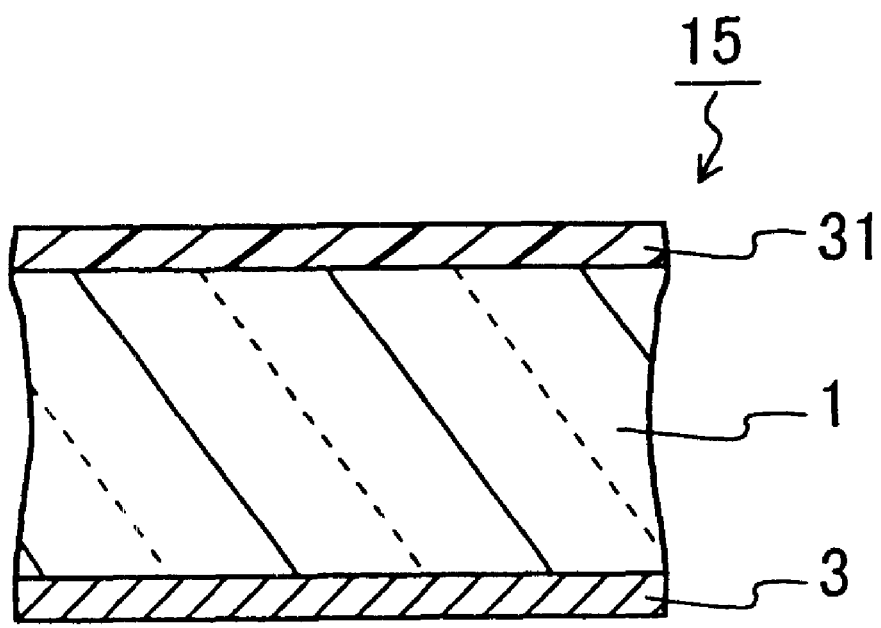
FIG. 5 is a partial sectional view showing an embodiment of a copier top plate using a glass sheet with a conductive film according to the present invention.

FIG. 5 is a sectional view of a copier top plate including a glass sheet with a conductive film of the present invention. In this top plate 15, a lubricant layer 31 is formed on a surface of a glass sheet with a conductive film 1 on which a transparent conductive film 3 is not formed. This lubricant layer 31 is formed to reduce the frictional resistance between the glass sheet and papers sequentially introduced and ejected automatically along the glass sheet. The lubricant layer 31 can be formed, specifically by an application of a lubricant such as, for example, a silicone oil or a fluorine-containing polymer lubricating oil. In this top plate, the transparent conductive film 3 serves for providing an antistatic function for the top plate.

Figure 13:
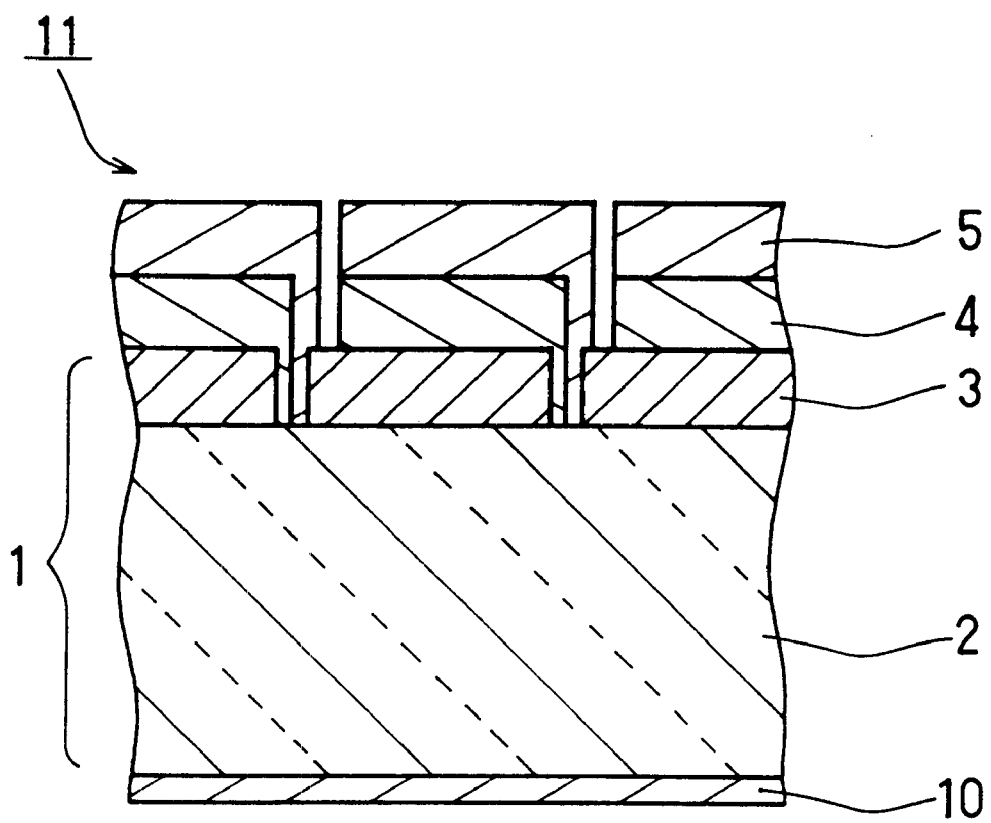
FIG. 13 is a partial sectional view showing a state where a reflection suppressing film further is formed on a light incident side of the solar cell shown in FIG. 1.
Figure 14:
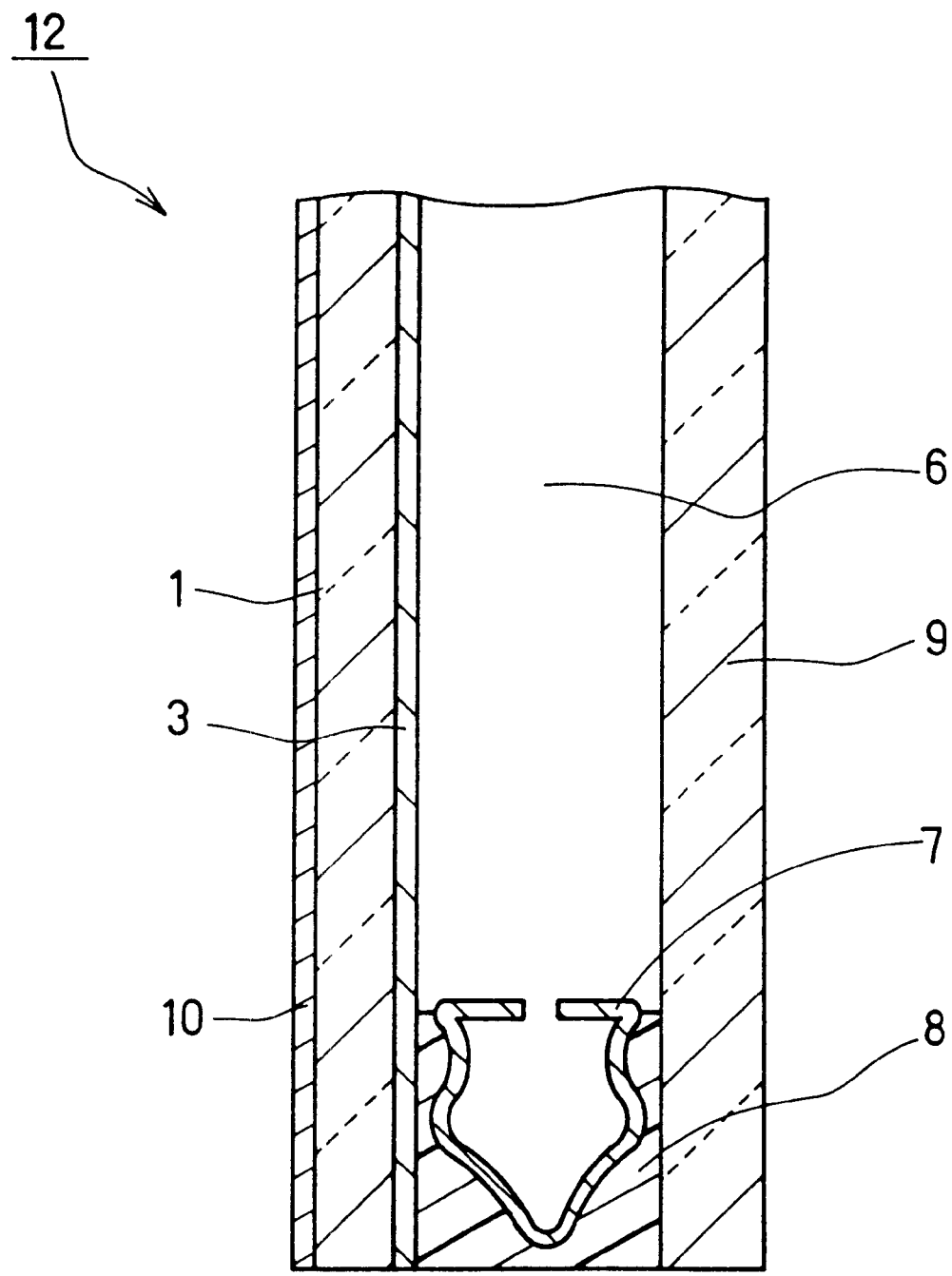
FIG. 14 is a partial sectional view showing a state where a reflection suppressing film further is formed on a side exposed to the air of the double-glazing unit shown in FIG. 2.

In the embodiments described above, the glass sheets with no reflection suppressing film were used. FIGS. 13 and 14 show an amorphous silicon solar cell and a double-glazing unit using a glass sheet with a reflection suppressing film formed thereon, respectively. Glass articles shown in FIGS. 13 and 14 correspond to those obtained by formation of reflection suppressing films 10 on the surfaces of glass articles shown in FIGS. 1 and 2 on which the conductive films are not formed.

In the above description, since a glass sheet with a conductive film of the present invention merely is used instead of a glass sheet (with a conductive film) that has been used conventionally, details of the equipment such as the information display, the copier, and the like are not shown in the figures.

EXAMPLES

The present invention is described further in detail using examples as follows, but is not limited to the following examples.

First, examples of manufacture of light-colored high-transmittance glass according to the present invention are described.

Examples 1 to 17

The compositions described in Tables 1-1 to 1-3 were prepared using alumina containing silica with a low iron content, limestone, dolomite, soda ash, salt cake (sodium sulfate), cerium oxide, manganese dioxide, and a carbonaceous reducing agent as raw materials. The respective materials were heated to 1450° C. in an electric furnace and thus were melted. After four-hour melting, the glass materials were poured onto stainless steel plates and then were annealed to have a room temperature. Thus, glasses with a thickness of about 10 mm were obtained.

Examples 18 to 22

The compositions described in Table 1-4 were prepared using alumina containing silica with a low iron content, limestone, dolomite, soda ash, salt cake, and a carbonaceous reducing agent as raw materials. The respective materials were melted using a conventional furnace for soda-lime glass (a tank-type furnace in which its upper part is heated) and were formed in a sheet shape by the float process. Thus, glass sheets with various thicknesses were obtained.

Next, glasses obtained from the respective examples were polished to have a thickness of 3.2 mm. With respect to each glass, the visible light transmittance, dominant wavelength, excitation purity, which were measured with the illuminant C, solar radiation transmittance, and ultraviolet ray transmittance prescribed in ISO 9050 and solar radiation transmittance were measured as optical characteristics. Tables 1-1 to 1-4 show optical characteristic values of the samples obtained.

Hereinafter, all the compositions in the tables are indicated on a weight percent basis and values of optical characteristics (except for dominant wavelength) are indicated on a percent basis.

TABLE 1-1

| Examples | 1 | 2 | 3 | 4 | 5 | 6 |
|---|---|---|---|---|---|---|
| $SiO_2$ | 71.7 | 72.2 | 71.7 | 71.2 | 72.2 | 71.7 |
| $Al_2O_3$ | 1.7 | 1.7 | 1.7 | 1.8 | 1.7 | 1.7 |
| MgO | 4.2 | 4.2 | 4.4 | 4.2 | 4.2 | 4.4 |
| CaO | 8.5 | 8.5 | 8.8 | 8.5 | 8.5 | 8.8 |
| $Na_2O$ | 13.0 | 12.5 | 12.5 | 13.1 | 12.5 | 12.5 |
| $K_2O$ | 0.7 | 0.7 | 0.7 | 1.0 | 0.7 | 0.7 |
| $SO_3$ | 0.12 | 0.20 | 0.15 | 0.18 | 0.20 | 0.15 |

TABLE 1-1-continued

| Examples | 1 | 2 | 3 | 4 | 5 | 6 |
|---|---|---|---|---|---|---|
| Total Iron Oxide | 0.025 | 0.025 | 0.036 | 0.036 | 0.045 | 0.055 |
| $TiO_2$ | 0.02 | 0.02 | 0.04 | 0.04 | 0.02 | 0.04 |
| Cerium Oxide | 0 | 0 | 0 | 0 | 0 | 0 |
| TOTAL | 100.0 | 100.0 | 100.0 | 100.0 | 100.0 | 100.0 |
| FeO | 0.008 | 0.005 | 0.010 | 0.008 | 0.009 | 0.019 |
| FeO Ratio | 36 | 22 | 31 | 25 | 22 | 38 |
| Visible Light Transmittance | 91.2 | 91.5 | 91.3 | 91.3 | 91.3 | 91.1 |
| Solar Radiation Transmittance | 90.0 | 90.7 | 89.5 | 89.9 | 89.5 | 88.5 |
| Ultraviolet Ray Transmittance | 79.4 | 79.7 | 77.9 | 76.9 | 75.0 | 73.5 |
| Dominant Wavelength (nm) | 529 | 547 | 499 | 513 | 525 | 530 |
| Excitation Purity | 0.08 | 0.10 | 0.14 | 0.08 | 0.15 | 0.17 |

TABLE 1-2

| Examples | 7 | 8 | 9 | 10 | 11 | 12 |
|---|---|---|---|---|---|---|
| $SiO_2$ | 71.0 | 71.7 | 71.6 | 72.0 | 71.1 | 71.3 |
| $Al_2O_3$ | 1.4 | 1.7 | 1.7 | 1.8 | 1.8 | 1.5 |
| MgO | 4.3 | 4.0 | 4.2 | 4.2 | 4.4 | 4.2 |
| CaO | 8.6 | 8.5 | 8.5 | 8.5 | 9.0 | 8.5 |
| $Na_2O$ | 13.5 | 13.0 | 13.0 | 12.5 | 12.6 | 13.1 |
| $K_2O$ | 0.7 | 0.7 | 0.7 | 0.7 | 0.7 | 1.0 |
| $SO_3$ | 0.22 | 0.25 | 0.20 | 0.21 | 0.23 | 0.23 |
| Total Iron Oxide | 0.031 | 0.031 | 0.036 | 0.036 | 0.036 | 0.036 |
| $TiO_2$ | 0.03 | 0.03 | 0.04 | 0.04 | 0.04 | 0.04 |
| Cerium Oxide | 0.2 | 0.1 | 0.05 | 0.05 | 0.075 | 0.1 |
| Manganese Oxide | 0 | 0 | 0 | 0 | 0 | 0 |
| TOTAL | 100.0 | 100.0 | 100.0 | 100.0 | 100.0 | 100.0 |
| FeO | 0.003 | 0.001 | 0.007 | 0.005 | 0.003 | 0.003 |
| FeO Ratio | 11 | 4 | 22 | 15 | 9 | 9 |
| Visible Light Transmittance | 91.6 | 91.8 | 91.4 | 91.7 | 91.6 | 91.6 |
| Solar Radiation Transmittance | 90.9 | 91.6 | 89.9 | 91.0 | 91.0 | 91.0 |
| Ultraviolet Ray Transmittance | 42.9 | 50.3 | 55.4 | 54.9 | 51.5 | 48.4 |
| Dominant Wavelength (nm) | 563 | 568 | 547 | 562 | 566 | 566 |
| Excitation Purity | 0.20 | 0.23 | 0.10 | 0.23 | 0.26 | 0.26 |

TABLE 1-3

| Examples | 13 | 14 | 15 | 16 | 17 |
|---|---|---|---|---|---|
| $SiO_2$ | 71.1 | 70.4 | 69.8 | 69.8 | 68.0 |
| $Al_2O_3$ | 1.8 | 1.9 | 2.9 | 4.9 | 2.5 |
| MgO | 4.4 | 2.1 | 3.9 | 2.1 | 5.9 |
| CaO | 9.0 | 11.2 | 7.8 | 8.9 | 8.1 |
| $Na_2O$ | 12.6 | 12.9 | 14.6 | 13.2 | 14.4 |
| $K_2O$ | 0.7 | 1.1 | 0.7 | 0.9 | 0.9 |
| $SO_3$ | 0.23 | 0.22 | 0.28 | 0.22 | 0.27 |
| Total Iron Oxide | 0.036 | 0.026 | 0.026 | 0.022 | 0.021 |
| $TiO_2$ | 0.04 | 0.03 | 0.03 | 0.04 | 0.03 |
| Cerium Oxide | 0 | 0 | 0 | 0 | 0 |
| Manganese Oxide | 0.075 | 0 | 0 | 0 | 0 |
| TOTAL | 100.0 | 100.0 | 100.0 | 100.0 | 100.0 |
| FeO | 0.003 | 0.008 | 0.006 | 0.005 | 0.004 |
| FeO Ratio | 9 | 34 | 26 | 25 | 21 |
| Visible Light Transmittance | 91.5 | 91.2 | 91.0 | 91.5 | 91.7 |
| Solar Radiation Transmittance | 91.0 | 90.1 | 90.3 | 90.8 | 90.9 |
| Ultraviolet Ray Transmittance | 60.5 | 79.1 | 79.3 | 79.6 | 79.7 |
| Dominant Wavelength (nm) | 570 | 530 | 533 | 520 | 551 |
| Excitation Purity | 0.23 | 0.11 | 0.12 | 0.09 | 0.07 |

TABLE 1-4

| Examples | 18 | 19 | 20 | 21 | 22 |
|---|---|---|---|---|---|
| $SiO_2$ | 71.7 | 71.7 | 71.8 | 71.6 | 71.8 |
| $Al_2O_3$ | 1.9 | 1.8 | 1.8 | 1.8 | 1.8 |
| MgO | 4.1 | 4.1 | 4.1 | 4.1 | 4.1 |
| CaO | 7.7 | 7.8 | 7.8 | 7.6 | 7.8 |
| $Na_2O$ | 13.1 | 13.1 | 13.0 | 13.2 | 12.9 |
| $K_2O$ | 1.34 | 1.34 | 1.31 | 1.34 | 1.37 |
| $SO_3$ | 0.18 | 0.19 | 0.17 | 0.21 | 0.22 |
| Total Iron Oxide | 0.057 | 0.045 | 0.033 | 0.027 | 0.022 |
| $TiO_2$ | 0.02 | 0.02 | 0.02 | 0.02 | 0.02 |
| Cerium Oxide | 0 | 0 | 0 | 0 | 0 |
| Manganese Oxide | 0 | 0 | 0 | 0 | 0 |
| TOTAL | 100.0 | 100.0 | 100.0 | 100.0 | 100.0 |
| FeO | 0.014 | 0.014 | 0.008 | 0.006 | 0.005 |
| FeO Ratio | 28 | 35 | 28 | 26 | 23 |
| Visible Light Transmittance | 90.8 | 91.1 | 91.1 | 91.3 | 91.7 |
| Solar Radiation Transmittance | 88.8 | 89.2 | 89.5 | 89.9 | 90.2 |
| Ultraviolet Ray Transmittance | 72.2 | 75.7 | 78.2 | 79.6 | 79.9 |
| Dominant Wavelength (nm) | 520 | 535 | 553 | 555 | 552 |
| Excitation Purity | 0.25 | 0.23 | 0.22 | 0.22 | 0.19 |

As is apparent from Tables 1-1 to 1-4, glasses with a thickness of 3.2 mm of Examples 1 to 22 have optical characteristics of a visible light transmittance measured with the illuminant C of at least 90% and a solar radiation transmittance of at least 87.5%.

Comparative Examples 1 to 4

Table 2 shows compositions and optical characteristics of comparative examples.

TABLE 2

| Comparative Examples | 1 | 2 | 3 | 4 |
|---|---|---|---|---|
| $SiO_2$ | 72.4 | 73.07 | 73.50 | 70.80 |
| $Al_2O_3$ | 1.42 | 1.80 | 0.90 | 1.90 |
| MgO | 4.1 | 0.08 | — | 3.70 |
| CaO | 8.0 | 10.11 | 9.00 | 8.90 |
| SrO | — | 0.21 | — | — |
| $Na_2O$ | 13.1 | 14.63 | 15.80 | 13.50 |
| $K_2O$ | 0.72 | 0.01 | 0.29 | 0.60 |
| $SO_3$ | 0.23 | 0.015 | 0.30 | 0.25 |
| Total Iron Oxide | 0.10 | 0.010 | 0.1 | 0.09 |
| $TiO_2$ | 0.03 | — | 0.04 | — |
| Cerium Oxide | — | — | — | — |
| $ZrO_2$ | — | 0.028 | — | — |
| TOTAL | 100.08 | 99.935 | 99.93 | 99.94 |
| FeO | 0.027 | | 0.028 | |
| FeO Ratio | 30 | 60 | 31 | |
| Sheet Thickness (mm) | 3.20 | 5.66 | 3.85 | |
| Visible Light Transmittance | 90.1 | 90.8 | 89.9* | |
| Solar Radiation Transmittance | 85.0 | 88.5 | — | — |
| Ultraviolet Ray Transmittance | 60.8 | — | — | — |
| Dominant Wavelength (nm) | 502 | 490.5 | 541 | — |
| Excitation Purity | 0.34 | 0.27 | 0.30 | — |

*A light source A was used as the light source.

Comparative Example 1 is typical soda-lime-based glass. Comparative Example 2 is an example in JP 4(1992)-228450 A cited in the present specification, Comparative Example 3 an example in JP 8(1996)-40742 A cited in the present specification, and Comparative Example 4 an example in JP 5(1993)-221683 A cited in the present specification.

In Comparative Example 1, the solar radiation transmittance is lower and the visible light transmittance also is lower than those in the glasses according to the present invention. In Comparative Example 2, similar characteristics to those of the glasses according to the present invention were obtained, but the iron oxide content is low, namely 0.010%. In order to achieve such a low iron oxide content, a special high purity raw material is required and therefore glass cost increases. In Comparative Example 3, its color tone assumed from the visible light transmittance and excitation purity is not considerably different from that of conventional soda-lime-based glass. With respect to Comparative Example 4, optical characteristics of the glass are not described specifically. However, when the transmittance at 400 nm is read from the spectral transmittance curve shown in the publication, the transmittance of conventional soda-lime-based glass described for comparison is about 87% and on the other hand, the transmittance of the glass according to Comparative Example 4 is about 83%. This indicates that the FeO content was reduced by the addition of cerium oxide and thus the $Fe_2O_3$ content increases, resulting in glass with a low transmittance in the shorter wavelength region of the visible light.

Table 3 shows the light transmittance at wavelengths of 500 nm and 1100 nm with respect to glass sheets of Examples 1 to 4 and 9 to 11.

TABLE 3

| Examples | 1 | 2 | 3 | 4 | 9 | 10 | 11 |
|---|---|---|---|---|---|---|---|
| Light Transmittance | | | | | | | |
| 500 nm | 91.3 | 91.6 | 91.5 | 91.4 | 91.5 | 91.7 | 91.5 |
| 1100 nm | 88.4 | 89.9 | 87.1 | 88.3 | 88.6 | 90.5 | 90.8 |

As shown in Table 3, transmittance of the respective glasses was at least 91% at a wavelength of 500 nm and not higher than 91% (not higher than 90% in Examples 1 to 4 and 9) at a wavelength of 1100 nm.

Comparative Examples 5 and 6

Furthermore, glasses with the following compositions also were produced as in the above and their optical characteristics were checked.

TABLE 4

| Comparative Examples | 5 (Very Low Iron Content Composition) | 6 (Conventional Composition) |
|---|---|---|
| $SiO_2$ | 72.40 | 72.20 |
| $Al_2O_3$ | 1.62 | 1.77 |
| MgO | 0.20 | 3.97 |
| CaO | 10.10 | 7.90 |
| SrO | 0.17 | 0 |
| $Na_2O$ | 15.00 | 12.90 |
| $K_2O$ | 0.04 | 1.05 |
| $SO_3$ | 0.23 | 0.19 |
| Total Iron Oxide | 0.02 | 0.08 |
| $TiO_2$ | 0.01 | 0.04 |
| Cerium Oxide | 0.06 | 0 |
| $ZrO_2$ | 0 | 0 |
| TOTAL | 99.85 | 100.10 |
| FeO | 110.002 | 0.02 |
| FeO Ratio | 10.0 | 26.3 |
| Sheet Thickness (mm) | 3.2 | 3.2 |
| Visible Light Transmittance | 92.0 | 90.4 |
| Solar Radiation Transmittance | 91.7 | 86.9 |
| Ultraviolet Ray Transmittance | 55.3 | 66.5 |
| Dominant Wavelength (nm) | 513 | 577 |
| Excitation Purity | 0.19 | 0.15 |
| Light Transmittance | | |
| 500 nm | 92 | 90.8 |
| 1100 nm | 92 | 82.6 |

Next, transparent conductive films were formed on the surfaces of the glass of Example 4 (hereinafter referred to as "light-colored high-transmittance glass"), the glass of Comparative Example 5 (hereinafter referred to as "very low iron content glass"), and the glass of Comparative Example 6 (hereinafter referred to as "conventional composition glass") by the CVD method, respectively. Each transparent conductive film was formed of a $SiO_2$ film and a $SnO_2$ film that are stacked.

A deposition method will be described.

A glass sheet that had been washed and then dried was used as a substrate. This glass substrate (with a thickness of 3.2 mm) was placed on a mesh belt of an open carrier furnace and was passed through the furnace to be heated to about 570° C.

When the $SiO_2$ film was formed, monosilane was used as its raw material. Specifically, monosilane, nitrogen, and oxygen were supplied to the surface of the heated glass substrate.

On the other hand, when the $SnO_2$ film was formed, monobutyltin trichloride was used as its material. Specifically, a gas containing vapor of monobutyltin chloride, oxygen, and nitrogen was supplied to the surface of the heated glass substrate. When a $SnO_2$ film (a $SnO_2$:F film) in which fluorine was added was to be formed, a gas containing oxygen, water vapor, nitrogen, and hydrogen fluoride mixed with vapor of monobutyltin chloride was applied to the surface of the glass substrate.

According to the above-mentioned deposition method, transparent conductive films were formed as follows with considerations to various applications.

Figure 6:
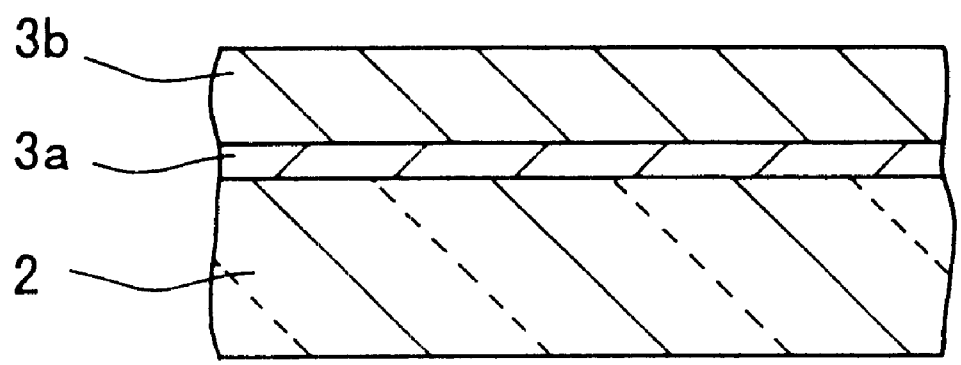
FIG. 6 is a sectional view showing an embodiment of a glass sheet with a conductive film according to the present invention.

Production of Glass Sheets with a Conductive Film for an Amorphous Silicon Solar Cell and Electromagnetic Wave Shielding Glass, and Production of an Amorphous Silicon Solar Cell By the CVD method, as shown in FIG. 6, a $SiO_2$ film (with a thickness of 20 nm) 3a and a $SnO_2$:F film (with a thickness of 700 nm) 3b were deposited sequentially on each of the above-mentioned three types of glass sheets 2. The films had a sheet resistance of 10 $\Omega$/sq. This value is smaller than that of the sheet resistance generally required when the glass sheets with the films are used as a substrate of an amorphous silicon solar cell or electromagnetic wave shielding glass.

Figure 9:
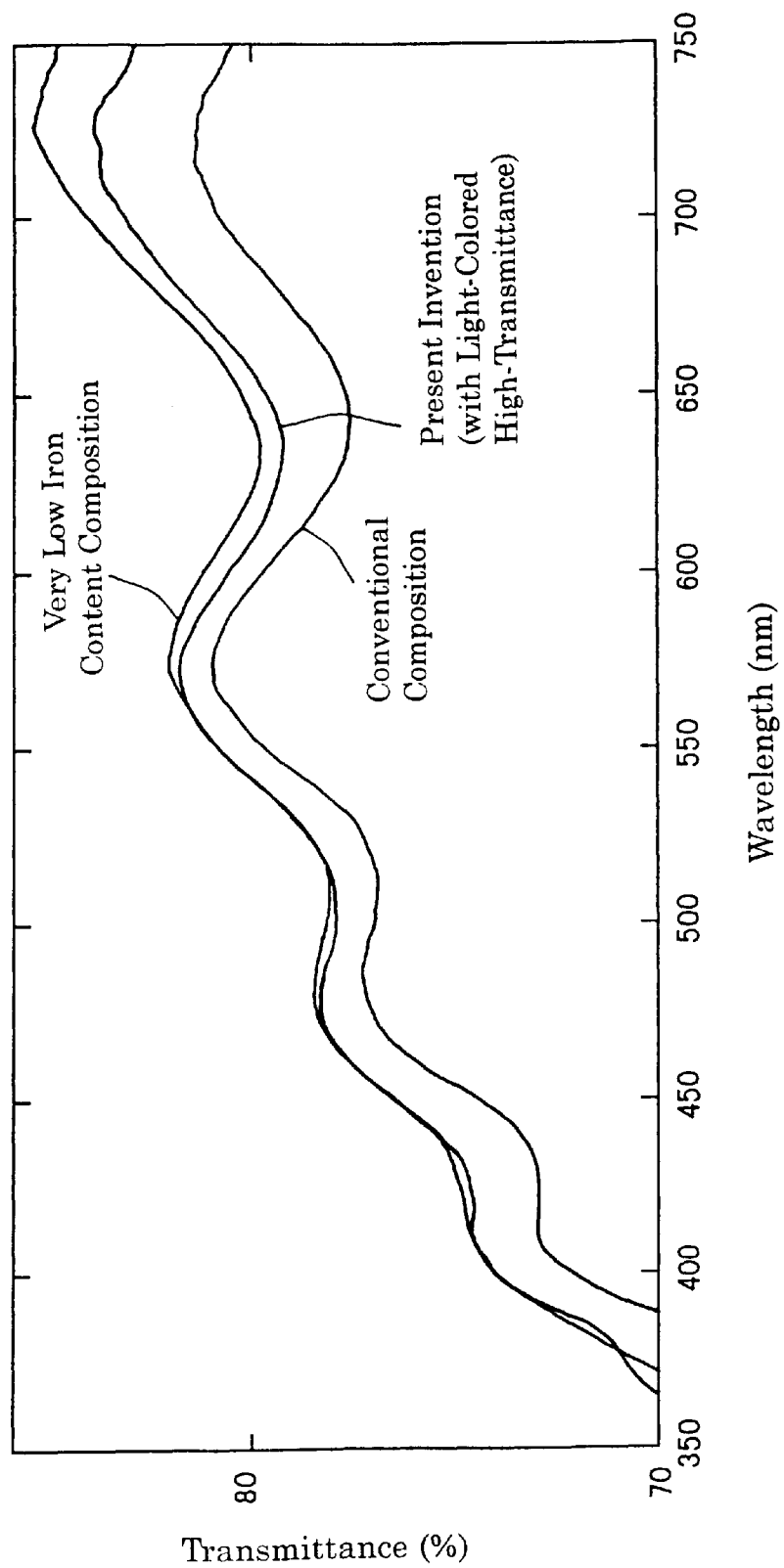
FIG. 9 is a graph showing the spectral transmission characteristics of an example of a glass sheet with a conductive film having the film structure shown in FIG. 6 and conventional glass sheets with a conductive film (in which the same films are formed on glass with an extremely low iron content and on glass with a conventional composition).

With respect to those glass sheets with a conductive film, spectral transmission characteristics in a wavelength region of 350 to 750 nm were measured. The results are shown in FIG. 9. As shown in FIG. 9, the light transmittance in the case of using the light-colored high-transmittance glass was comparable to that in the case of using the very low iron content glass, in the wavelength region (particularly 500 to 600 nm) having a significant effect on conversion efficiency of an amorphous silicon solar cell. On the other hand, the glass sheet with a conductive film using the conventional composition glass had a considerably lower light transmittance in the above-mentioned wavelength region.

Figure 7:
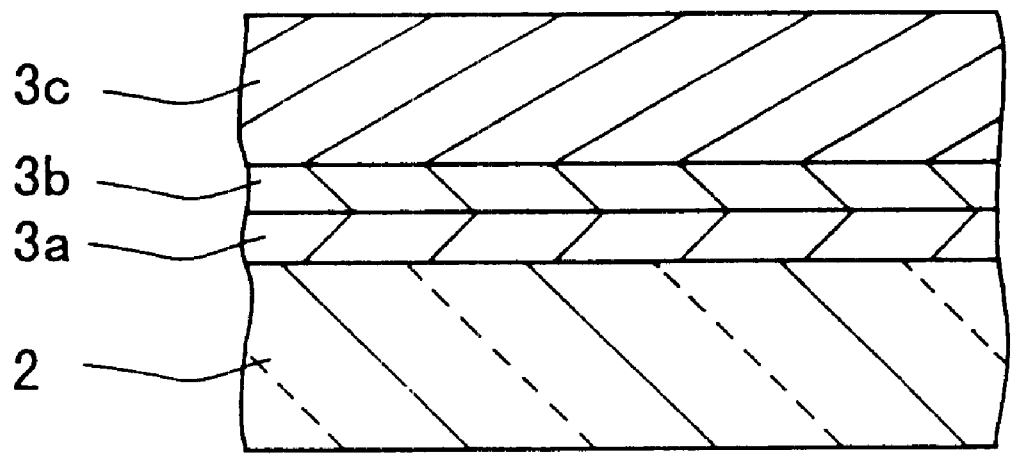
FIG. 7 is a sectional view showing an embodiment of a glass sheet with a conductive film according to the present invention.

Furthermore, by the CVD method, as shown in FIG. 7, a $SnO_2$ film (with a thickness of 25 nm) 3a, a $SO_2$ film (with a thickness of 25 nm) 3b and a $SnO_2$:F film (with a thickness of 700 nm) 3c were deposited sequentially on each of the above-mentioned three types of glass sheets 2. The films had a sheet resistance of 9 $\Omega$/sq. This value is smaller than that of the sheet resistance generally required when the glass sheet with the films are used as a substrate of an amorphous silicon solar cell or electromagnetic wave shielding glass.

Figure 10:
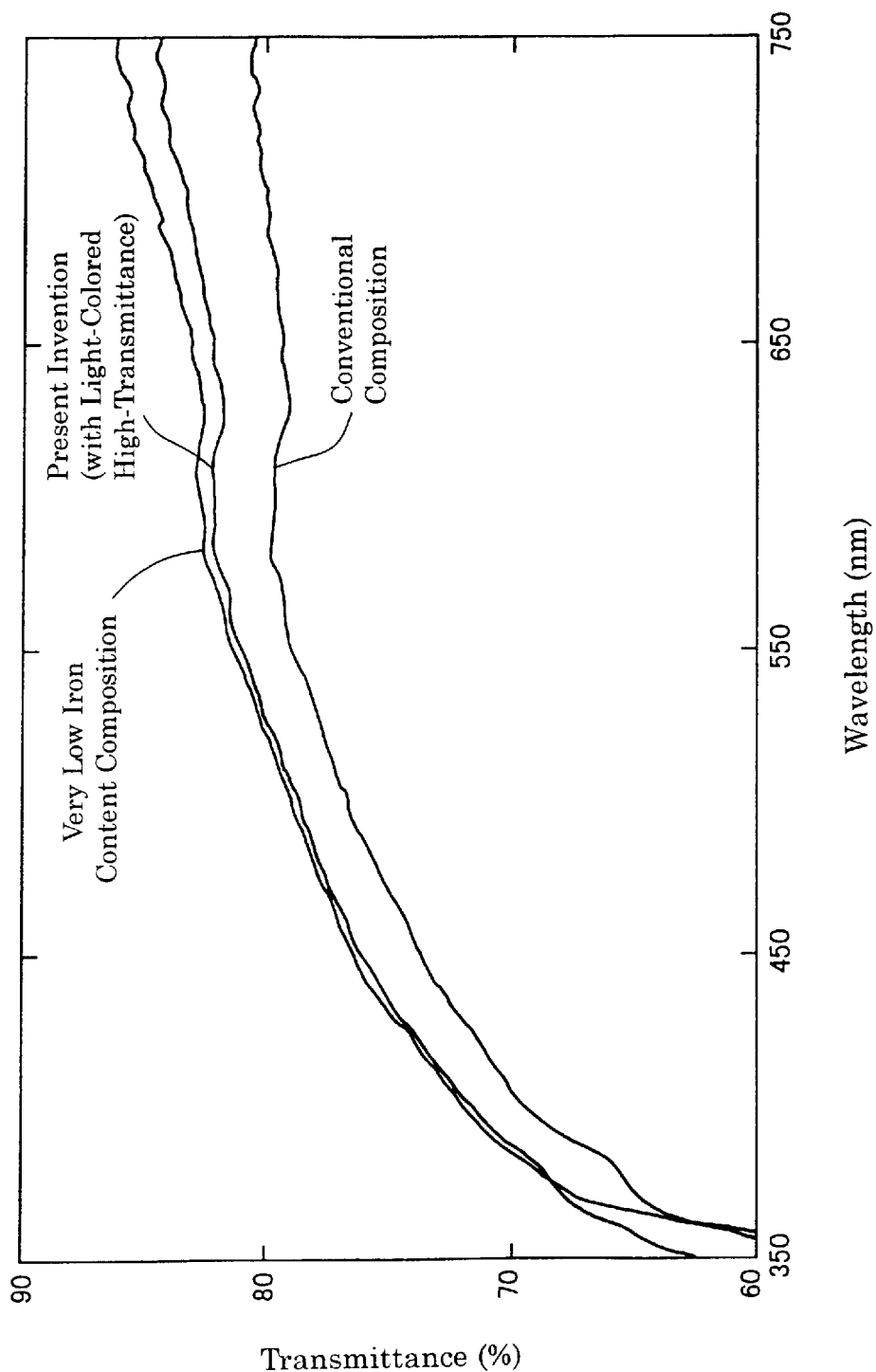
FIG. 10 is a graph showing the spectral transmission characteristics of an example of a glass sheet with a conductive film having the film structure shown in FIG. 7 and conventional glass sheets with a conductive film (in which the same films are formed on glass with an extremely low iron content and on glass with a conventional composition).

With respect to those glass sheets with a conductive film, spectral transmission characteristics in a wavelength region of 350 to 750 nm were measured. The results are shown in FIG. 10. As shown in FIG. 10, the light transmittance in the case of using the light-colored high-transmittance glass was comparable to that in the case of using the very low iron content glass, in the wavelength region (particularly 500 to 600 nm) having a significant effect on conversion efficiency of an amorphous silicon solar cell. On the other hand, the glass sheet with a conductive film using the conventional composition glass had a considerably lower light transmittance in the above-mentioned wavelength region.

As described above, when compared to the case of using the very low iron content glass, the glass sheet with a conductive film including the light-colored high-transmittance glass had a slightly lower light transmittance in the long wavelength region (substantially from the red wavelength region on), but had a comparable characteristic in the wavelength region having a considerable effect on conversion efficiency of an amorphous silicon solar cell. Similarly, when used as electromagnetic wave shielding glass, the glass sheet with a conductive film including the light-colored high-transmittance glass had transmission characteristics equivalent to those in the case of using the very low iron content glass in the wavelength region around 500 nm in which the visibility is high, as in the above. Thus, when the light-colored high-transmittance glass was used, the characteristics that had not been obtained conventionally unless an expensive material had been used were obtained at low cost.

When it is used for an amorphous silicon solar cell and electromagnetic wave shielding window glass, the thickness of the $SnO_2$:F film is not particularly limited, but preferably is 600 nm to 1000 nm. When it is used for the above-mentioned respective applications, preferably the sheet resistance of the transparent conductive film is not more than 10 $\Omega$/sq.

Figure 8:
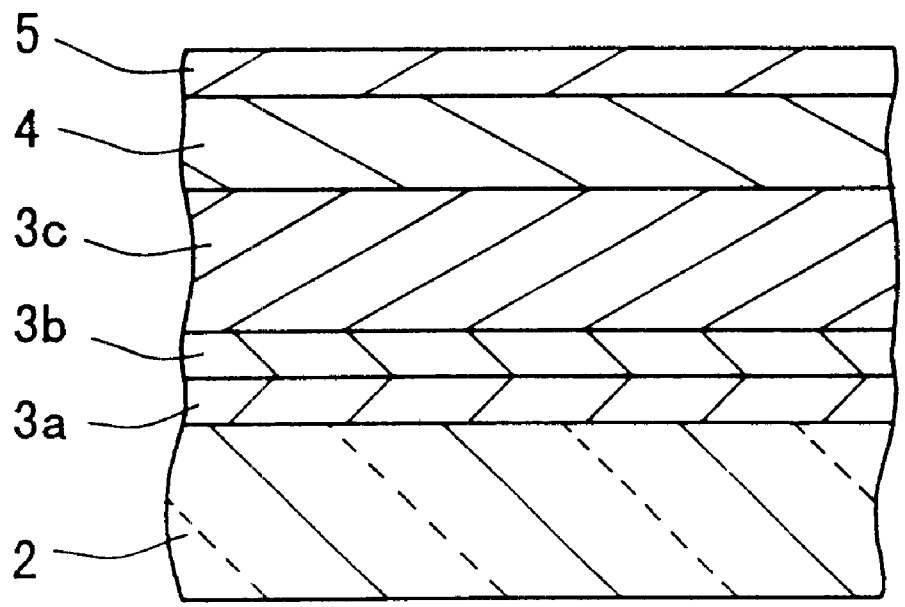
FIG. 8 is a sectional view showing an example of a film structure of a solar cell according to the present invention.

An amorphous silicon solar cell with the film structure shown in FIG. 8 was produced using the above-mentioned glass sheet with a conductive film with the film structure shown in FIG. 7. An amorphous silicon (a-Si:H) layer 4 was produced using monosilane diluted with a hydrogen gas as its material by a plasma CVD method utilizing a glow discharge. As the amorphous silicon layer 4, a p layer (with a thickness of about 10 nm), an i layer (with a thickness of about 300 to 350 nm), and an n layer (with a thickness of about 40 nm) were stacked sequentially from the transparent conductive film side so that a pin junction was formed. The p layer was deposited using the material gas to which methane and diborane were added, and the n layer was deposited using the material gas to which phosphine was added. Subsequently, an aluminum film was formed as a metal electrode layer 5 on the surface of the amorphous silicon layer 4 by a vacuum evaporation method.

The conversion efficiency of the solar cells thus produced using the above-mentioned three types of glass sheets was measured under the same conditions. As a result, when the conversion efficiency in the case of using the conventional composition glass was taken as 1.0, the conversion efficiency in the cases of using the very low iron content glass and the light-colored high-transmittance glass was 1.1.

Production of Glass Sheets with a Transparent Conductive Film for a Multiple-Glazing Unit with Low Emissivity and a High Heat Insulating Property, for a Transparent Heating Element, and for an Information Display By the CVD method, a $SnO_2$ film (with a thickness of 25 nm), a $SiO_2$ film (with a thickness of 25 nm) and a $SnO_2$:F film (with a thickness of 350 nm) were deposited sequentially on each of the above-mentioned three types of glass sheets, as in the film structure shown in FIG. 7. The films had a sheet resistance of 14 $\Omega$/sq. This value is smaller than that of the sheet resistance generally required when the glass sheets with the films are used as low emissivity glass for a multiple-glazing unit, a transparent heating element for a refrigerator door, or a glass substrate for an information display. In addition, the normal emissivity was 0.13.

Figure 11:
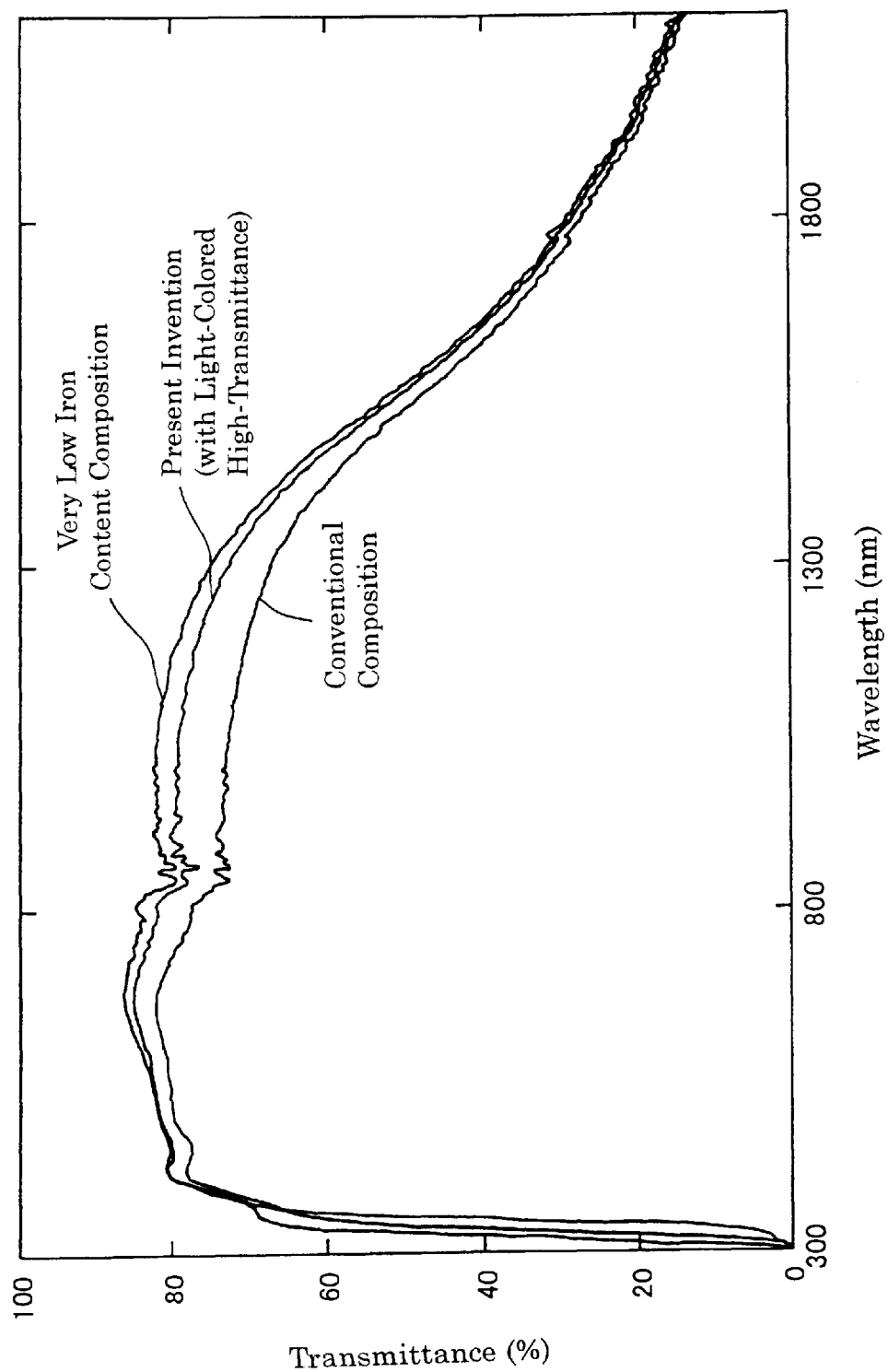
FIG. 11 is a graph showing the spectral transmission characteristics of another example of a glass sheet with a conductive film having the film structure shown in FIG. 7 and conventional glass sheets with a conductive film (in which the same films are formed on glass with an extremely low iron content and on glass with a conventional composition).

With respect to those glass sheets with a conductive film, spectral transmission characteristics in a wavelength region around 350 to 2000 nm were measured. The results are shown in FIG. 11. As shown in FIG. 11, in the visible light region, the glass sheet with a conductive film including the light-colored high-transmittance glass had a slightly lower light transmittance in the red wavelength region but has comparable characteristics in the wavelength region around 550 nm in which the visibility is high when compared to the case of using the very low iron content glass. On the other hand, the glass sheet with a conductive film including the conventional composition glass sheet had a considerably lower light transmittance in the above-mentioned wavelength region.

The glass sheet with a conductive film including the light-colored high-transmittance glass has higher transmittance particularly in the region between the red visible range and the near infrared range as compared to that in the case of using the conventional composition glass sheet. This point is advantageous in reducing a heating load in multiple-glazing units with low emissivity and a high heat insulating property in cold districts.

As described above, when compared to the case using the very low iron content glass sheet, the glass sheet with a conductive film including the light-colored high-transmittance glass had a slightly lower light transmittance in the long wavelength region (substantially from the red wavelength region on), but had comparable characteristics in the visible light region (particularly in the wavelength region in which the visibility is high) to which much significance is given when being used as a glass sheet with a conductive film for a multiple-glazing unit with low emissivity and a high heat insulating property, a transparent heating element, and an information display. In the above-mentioned applications, the characteristics that had not been obtained conventionally unless an expensive material had been used were obtained at low cost when the light-colored high-transmittance glass was used.

When it is incorporated into a low emissivity multiple-glazing unit, a refrigerator door plate, and an information display, the thickness of the $SnO_2$:F film is not particularly limited, but preferably is 50 nm to 500 nm. Preferable sheet resistance of the transparent conductive film is not more than 15 $\Omega$/sq. when it is used for a low emissivity multiple-glazing unit, 50 $\Omega$/sq. to 500 $\Omega$/sq. when it is used as an heating element of a refrigerator door, and not more than 100 $\Omega$/sq. when it is used for a glass substrate to be incorporated into an information display.

Production of a Glass Sheet with a Conductive Film for a Copier Document Plate

By the CVD method, a $SiO_2$ film (with a thickness of 10 nm) and a $SnO_2$:F film (with a thickness of 25 nm) were deposited sequentially on the above-mentioned three types of glass sheets as in the film structure shown in FIG. 6. The films had a sheet resistance of 5 k$\Omega$/sq. This value allows the purpose of providing an antistatic effect to be achieved sufficiently.

Figure 12:
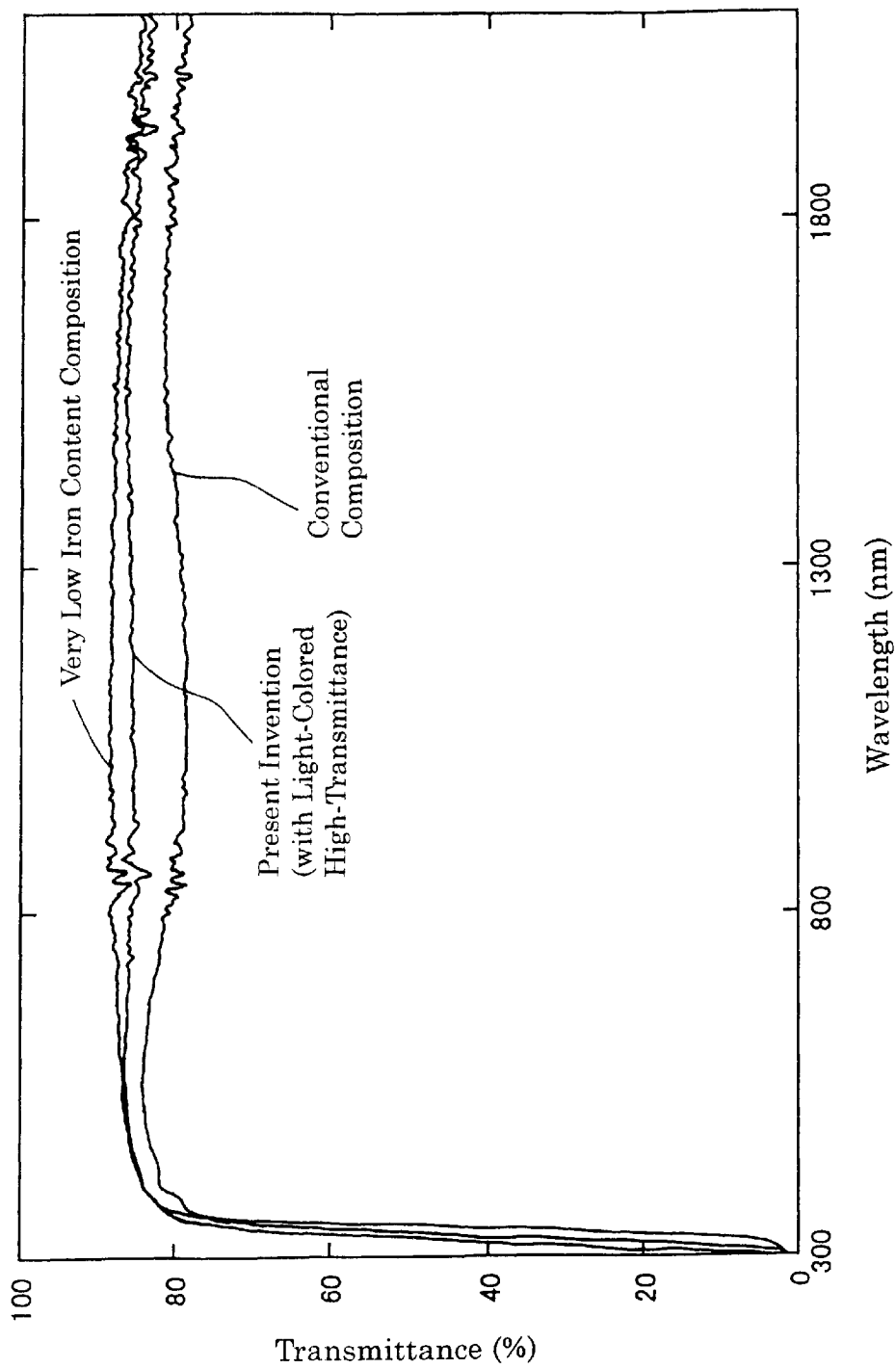
FIG. 12 is a graph showing the spectral transmission characteristics of another example of a glass sheet with a conductive film having the film structure shown in FIG. 6 and conventional glass sheets with a conductive film (in which the same films are formed on glass with an extremely low iron content and on glass with a conventional composition).

With respect to those glass sheets with a conductive film, spectral transmission characteristics in a wavelength region around 350 to 2000 nm were measured. The results are shown in FIG. 12. As shown in FIG. 12, in the visible light region, the glass sheet with a conductive film including the light-colored high-transmittance glass had a slightly lower light transmittance in the red wavelength region but has a comparable characteristic in the visible light region when compared to the case of using the very low iron content glass. On the other hand, the glass sheet with a conductive film including the conventional composition glass sheet has a clearly lower light transmittance in the above-mentioned wavelength region.

As described above, when compared to the case of using the very low iron content glass sheet, the glass sheet with a conductive film including the light-colored high-transmittance glass had comparable characteristics in the visible light region to which much significance is given when being used as a copier document plate. Thus, similarly in the above-mentioned application, the characteristics that had not been obtained conventionally unless an expensive material had been used were obtained at low cost when the light-colored high-transmittance glass was used.

When it is incorporated into a copier document plate, the thickness of the $SnO_2$:F film is not particularly limited, but preferably is 15 nm to 50 nm. Preferable sheet resistance of the transparent conductive film is 1 k$\Omega$/sq. to 1000 k$\Omega$/sq. when the glass sheet with the transparent conductive film is used for the above-mentioned application.

In addition, the following description is directed to an example of the formation of a reflection suppressing film on a surface of a glass sheet with a conductive film. By the method explained with reference to FIG. 6, a $SiO_2$ film (with a thickness of 20 nm) and a $SnO_2$:F film (with a thickness of 700 nm) were deposited sequentially to form a transparent conductive film on a surface of light-colored high-transmittance glass as in the above.

This glass sheet was annealed in an annealing furnace and then the M liquid described below was applied to the surface with no film (the opposite surface to that on which the transparent conductive film was formed) by a gravure coating method. This was irradiated with ultraviolet rays for 30 seconds at an irradiation intensity of 15 mW/cm$^2$ from a distance of 10 cm using a high pressure mercury lamp with 160 W/cm and thus a first layer film was formed. Subsequently, the H liquid described below was applied onto the first layer film, and this was irradiated with ultraviolet rays using the above-mentioned high pressure mercury lamp under the same conditions (the distance, irradiation intensity, and irradiation time) as in the above. Thus a second layer was obtained. Then, the $L_2$ liquid described below was applied onto the second layer, and this was irradiated with ultraviolet rays using the above-mentioned high pressure mercury lamp under the same conditions as in the above. Thus a third layer was obtained. This was heated for 30 seconds in an electric furnace heated to 720° C., and thus a glass sheet was obtained which included the first layer film, the second layer film, and the third layer film stacked sequentially on the substrate surface.

Preparation of a Solution Composition (H Liquid) for Forming a High Refractive Index Film 24.9 g bismuth nitrate pentahydrate (a bismuth material) was mixed with 118.6 g 2-ethoxyethanol, and 170.7 g tetraisopropoxy titanium (a titanium material) was added thereto. This was stirred at 60° C. for three hours and then was cooled to room temperature. Thus, a solution composition for forming a high refractive index film was obtained (the H liquid). The H liquid contained 96 mol % titanium and 4 mol % bismuth based on $TiO_2$ and $Bi_2O_3$, respectively.

Preparation of a Solution Composition ($L_1$ Liquid) for Forming a Low Refractive Index Film 150 g ethyl silicate ("ethyl silicate 40" manufactured by Colcoat Co., Ltd.) was mixed with 132 g ethylcellosolve, and 18 g 0.1 mol/litre hydrochloric acid was added thereto. This was stirred at room temperature for two hours (the $L_1$ liquid).

Preparation of a Solution Composition (M Liquid) for Forming an Intermediate Refractive Index Film The H liquid was mixed with the $L_1$ liquid so that a $SiO_2$ content was 50 mol % on an oxide basis, and thus a solution composition for forming an intermediate refractive index film was obtained (the M liquid). The M liquid contained 50 mol % silicon, 49 mol % titanium, and 1 mol % bismuth based on $SiO_2$, $TiO_2$, and $Bi_2O_3$, respectively.

Preparation of a Solution Composition ($L_2$ Liquid) for Forming a Low Refractive Index Film The H liquid was mixed with the $L_1$ liquid so that the $SiO_2$ content was 90 mol % on an oxide basis, and thus a solution composition for forming a low refractive index film was obtained (the $L_2$ liquid). The $L_2$ liquid contained 90 mol % silicon, 9.8 mol % titanium, and 0.2 mol % bismuth based on $SiO_2$, $TiO_2$, and $Bi_2O_3$, respectively.

Figure 15:
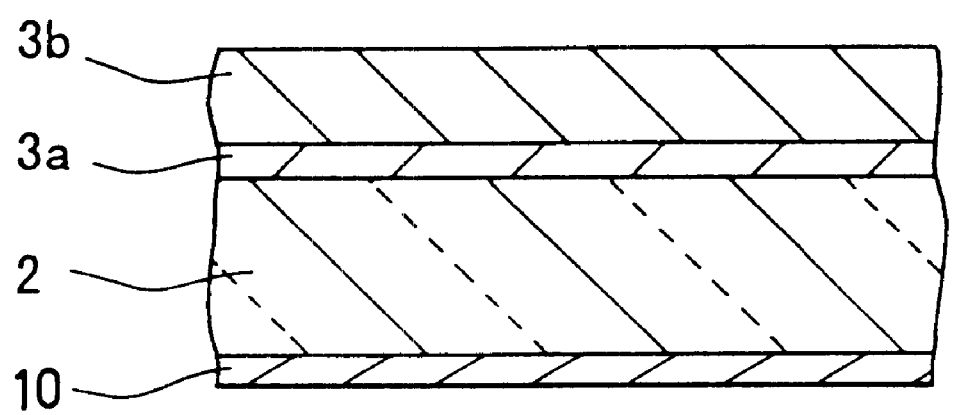
FIG. 15 is a sectional view showing an embodiment in which a reflection suppressing film further is formed on a side with no film of the glass sheet with a conductive film shown in FIG. 6.
Figure 16:
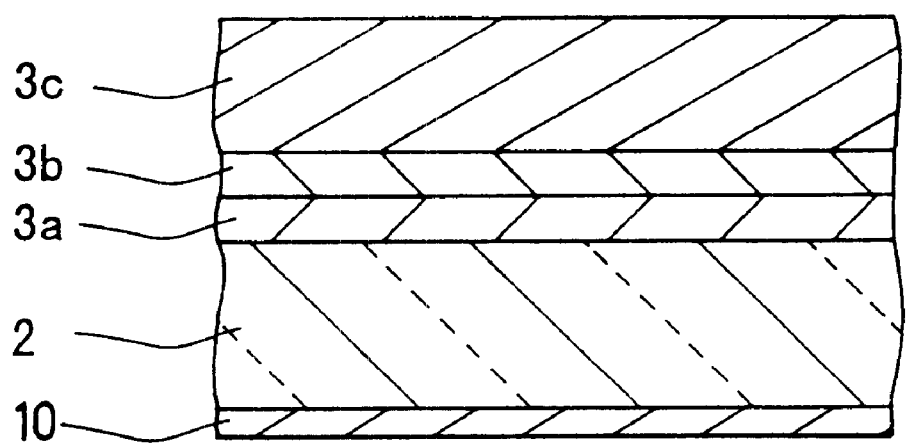
FIG. 16 is a sectional view showing an embodiment in which a reflection suppressing film further is formed on a side with no film of the glass sheet with a conductive film shown in FIG. 7.

The glass sheet with a reflection suppressing multilayer film thus formed thereon had a visible light reflectance (reflectance with respect to light to be incident on the side on which the reflection suppressing film was formed) of 8.5%, which was lower by about 3% when compared to that before the formation of the reflection suppressing film. The sectional view of this glass sheet is shown in FIG. 15. Thus, it was confirmed that an effect of decreasing the reflectance was obtained when the reflection suppressing film 10 was formed. The same reflection suppressing effect as in the above also was obtained in a glass sheet (FIG. 16) with the reflection suppressing film 10 formed on the glass sheet with a conductive film shown in FIG. 7.

Furthermore, in a step of forming the reflection suppressing film, the glass sheet was taken out from the electric furnace heated to 720° C. and air from an air nozzle was blown onto both whole surfaces of the glass sheet. Thus, the glass sheet was tempered by air cooling. This glass sheet was crushed using a punch and as a result, cracks spontaneously ran in a network form in the glass sheet. Thus, when the glass sheet is quenched after heated in forming the reflection suppressing film, the glass sheet is allowed to be a tempered glass while the reflection suppressing film is formed.

In addition, the following description is directed to another example of the formation of a reflection suppressing film on a surface of a glass sheet with a conductive film. According to the method described with reference to FIG. 7, a $SnO_2$ film (with a thickness of 25 nm), a $SiO_2$ film (with a thickness of 25 nm) and a $SnO_2$:F film (with a thickness of 700 nm) were deposited sequentially on a surface of a light-colored high-transmittance glass as in the above. Thus, a transparent conductive film was formed.

Next, the surface of the transparent conductive film formed on the glass sheet was masked and then this glass sheet was immersed, for two hours, in a silica saturated aqueous solution (five litre) of hexafluorosilicic acid with a concentration of 1.25 mole/litre to which 0.05 mole boric acid and 0.008 mole potassium fluoride were added. Then, the glass sheet was drawn out and the mask was removed, which then was washed and dried. Thus, a silica skeleton layer was formed on the principal surface on which the transparent conductive film was not formed. This silica skeleton layer had a thickness of 100 nm.

Figure 17:
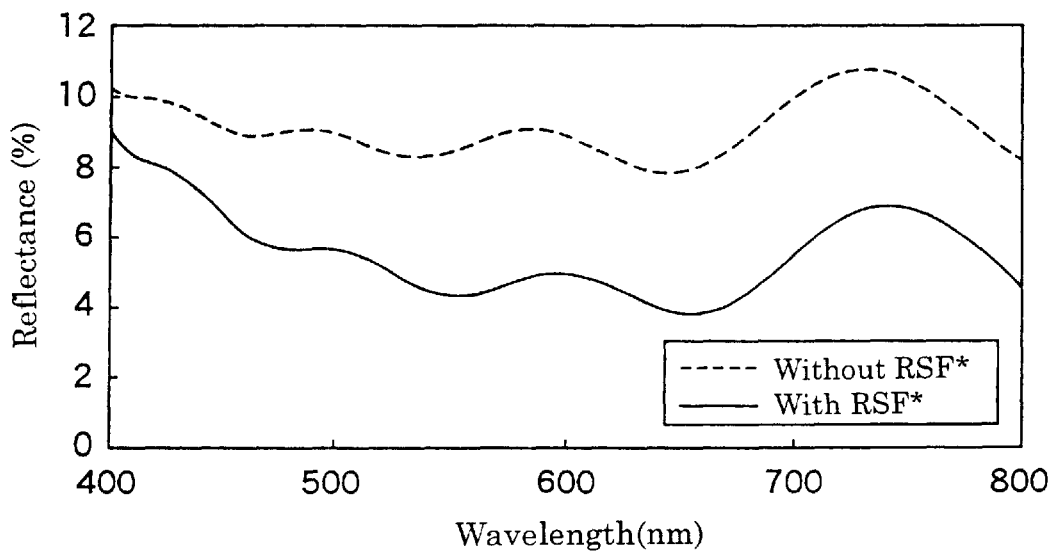
FIG. 17 shows a spectral reflectance curve in the visible light range of a glass sheet in which a reflection suppressing film further is formed on a side with no film of the glass sheet with a conductive film shown in FIG. 7.

The glass sheet with the silica skeleton layer (a reflection suppressing film) thus formed thereon had a visible light reflectance (reflectance with respect to light to be incident on the side on which a reflection suppressing film was formed) of 5.5%, which was lower by about 3.6% when compared to that before the formation of the reflection suppressing film. The spectral reflectance of this glass sheet with the reflection suppressing film in the visible light region is shown in FIG. 17. This glass sheet had substantially the same cross-section as that shown in FIG. 16 and was allowed to be tempered glass as in the above through quenching after heating.

The above-mentioned examples are merely examples of the present invention and the present invention is not limited by the examples described above.

INDUSTRIAL APPLICABILITY

As described above, the present invention provides a light-colored high-transmittance glass and a glass sheet with a conductive film that have high transmittance and can be mass-produced at low cost. Furthermore, the present invention also provides various glass articles obtained using such a glass sheet with a conductive film. In such glass articles, although glass sheets with a conductive film that can be mass-produced at low cost are used, the glass sheets have excellent transmission characteristics in significant wavelength regions for the respective articles. In addition, according to the present invention, a glass sheet with a conductive film with further improved optical characteristics also can be obtained particularly by the formation of a reflection suppressing film on a side with no film (on the side on which the transparent conductive film is not formed) used often on a side on which light is incident.

Thus, the present invention has a great industrial utility value in various industrial fields utilizing glass.

What is claimed is:

1. Light-colored high-transmittance glass formed as a glass sheet containing silica as a main component,
   the light-colored high-transmittance glass having a composition containing, as coloring components, on a weight percent basis:
   0.02 to less than 0.06% total iron oxide (T-$Fe_2O_3$) based on $Fe_2O_3$;
   at least 0.001% and less than 0.024% FeO; and
   0 to 0.5% cerium oxide,
   wherein the coloring components have a ratio of FeO based on $Fe_2O_3$ to T-$Fe_2O_3$ of less than 40%, and
   the glass has a solar radiation transmittance of at least 87.5% and a visible light transmittance measured with the illuminant C of at least 90% when measured at a glass thickness of 3.2 mm.

2. The light-colored high-transmittance glass according to claim 1, wherein the composition contains 0.02 to 0.05% T-$Fe_2O_3$ and less than 0.016% FeO.

3. The light-colored high-transmittance glass according to claim 1, wherein a dominant wavelength is longer than 495 nm and shorter than 575 nm and an excitation purity is not higher than 0.4%.

4. The light-colored high-transmittance glass according to claim 1, wherein the composition contains more than 0.004% FeO and has a FeO ratio of at least 15%, and
   a dominant wavelength is shorter than 565 nm and an excitation purity is not higher than 0.3% measured with the illuminant C when measured at a glass thickness of 3.2 mm.

5. The light-colored high-transmittance glass according to claim 4, wherein the composition contains less than 0.012% FeO and has a FeO ratio of 20 to 30%, and
   the dominant wavelength is shorter than 560 nm, measured with the illuminant C when measured at a glass thickness of 3.2 mm.

6. The light-colored high-transmittance glass according to claim 1, wherein the composition contains less than 0.008% FeO and 0.025 to 0.5% cerium oxide and has a FeO ratio of not higher than 22%;
   the solar radiation transmittance is at least 89.5%;
   an ultraviolet ray transmittance prescribed in ISO 9050 is not higher than 60%; and
   a dominant wavelength measured with the illuminant C is longer than 540 nm when measured at a glass thickness of 3.2 mm.

7. The light-colored high-transmittance glass according to claim 6, wherein the composition contains less than 0.006% FeO and 0.025 to 0.25% cerium oxide;
   the solar radiation transmittance is at least 90.5%;
   the ultraviolet ray transmittance prescribed in ISO 9050 is not higher than 55%; and the dominant wavelength measured with the illuminant C is longer than 555 nm when measured at a glass thickness of 3.2 mm.

8. The light-colored high-transmittance glass according to claim 1, wherein the composition contains as basic components, on a weight percent basis:

65 to 80% $SiO_2$;

0 to 5% $Al_2O_3$;

more than 2% MgO;

5 to 15% CaO;

10 to 18% $Na_2O$;

0 to 5% $K_2O$;

more than 7 to 17% MgO+CaO;

10 to 20% $Na_2O+K_2O$;

0.05 to 0.3% $SO_3$; and 0 to 5% $B_2O_3$.

9. The light-colored high-transmittance glass according to claim 8, wherein the composition contains more than 10% MgO+CaO and more than 0.1% $SO_3$.

10. The light-colored high-transmittance glass according to claim 9, being substantially free from fluorine, barium oxide, and strontium oxide.

11. The light-colored high-transmittance glass according to claim 1, being substantially free from any coloring component except for iron oxide, cerium oxide, and manganese oxide.

12. Light-colored high-transmittance glass formed as a glass sheet containing silica as a main component and at least 0.001 wt. % FeO as a coloring component, wherein when having a thickness of 3.2 mm, the light-colored high-transmittance glass has:

a light transmittance of at least 9.1% at a wavelength of 500 nm; and a light transmittance of not higher than 91% in a wavelength at 1100 nm.

13. The light-colored high-transmittance glass according to claim 1, being used as one of substrate glass or cover glass for a solar cell panel, a material for a solar-energy collecting water heater, a solar heat transmitting window glass material, an uncolored high-transmittance mirror, uncolored high transmittance window glass, display protection case glass, or substrate glass for a flat display such as a front panel.

14. A method of manufacturing light-colored high-transmittance glass according to claim 1, using a raw material comprising dolomite and limestone.

15. A method of manufacturing light-colored high-transmittance glass according to claim 14, using a raw material comprising alumina-containing silica sand.

16. A method of manufacturing light-colored high-transmittance glass according to claim 14, wherein the raw material is melted in a tank-type furnace in which its upper part is heated.

17. A glass sheet with a conductive film, comprising: a glass sheet formed of light-colored high-transmittance glass according to claim 1; and a transparent conductive film formed on a surface of the glass sheet.

18. The glass sheet with a conductive film according to claim 17, wherein the glass sheet containing silica as a main component is produced with a raw material containing limestone and dolomite.

19. The glass sheet with a conductive film according to claim 17, wherein the transparent conductive film is formed of at least one metal oxide layer and the at least one metal oxide layer includes a layer containing tin oxide as a main component.

20. The glass sheet with a conductive film according to claim 19, wherein the layer containing tin oxide as a main component contains at least one selected from chlorine, fluorine, and antimony.

21. The glass sheet with a conductive film according to claim 17, wherein the transparent conductive film is formed on a glass ribbon during a process of manufacturing the glass sheet by a float process using heat of the glass ribbon.

22. The glass sheet with a conductive film according to claim 17, further comprising a reflection suppressing film, wherein the glass sheet has a pair of principal surfaces parallel to each other, the transparent conductive film is formed on one of the pair of principal surfaces, and the reflection suppressing film is formed on the other of the pair of principal surfaces.

23. The glass sheet with a conductive film according to claim 22, wherein the reflection suppressing film is formed by a method including applying an application liquid and then baking it.

24. The glass sheet with a conductive film according to claim 22, wherein the reflection suppressing film includes a plurality of layers with different refractive indexes from each other.

25. The glass sheet with a conductive film according to claim 22, wherein the reflection suppressing film is formed by a method including quenching, and the glass sheet is tempered by the quenching.

26. A method of manufacturing a glass sheet with a conductive film according to claim 17, comprising forming the transparent conductive film on a glass ribbon during a process of manufacturing the glass sheet by a float process using heat of the glass ribbon.

27. The method of manufacturing a glass sheet with a conductive film according to claim 26, wherein the transparent conductive film is formed on one of a pair of principal surfaces parallel to each other and then a reflection suppressing film is formed on the other of the pair of principal surfaces.

28. A photoelectric conversion device, comprising:

a glass sheet with a conductive film according to claim 17; and a photoelectric conversion layer formed on a surface of the transparent conductive film of the glass sheet with a conductive film.

29. A multiple-glazing unit, comprising:

at least two glass sheets; and a layer selected from an air layer, an inert gas layer, and a reduced pressure layer, the at least two glass sheets are placed to oppose to each other via the layer, wherein at least one of the glass sheets is a glass sheet with a conductive film according to claim 17.

30. A refrigerator, comprising a door and a multiple-glazing unit according to claim 29, wherein the multiple-glazing unit is installed in the door, and the transparent conductive film included in the multiple-glazing unit is used as a heating element.

31. An information display, comprising a glass sheet with a conductive film according to claim 17, wherein information is displayed through the glass sheet with a conductive film.

32. A copying machine, comprising a glass sheet with a conductive film according to claim 17, wherein information to be copied is optically read through the glass sheet with a conductive film.

* * * * *